United States Patent
Watanabe et al.

(10) Patent No.: US 6,737,145 B1
(45) Date of Patent: May 18, 2004

(54) ORGANIC-INORGANIC COMPOSITE GRADED MATERIAL, METHOD FOR PREPARATION THEREOF AND USE THEREOF

(75) Inventors: Toshiya Watanabe, 15-7, Kugenuma-kaigan 6-chome, Fujisawa-shi, Kanagawa-ken (JP), 251-0037; Kazuhito Hashimoto, No. D-213, New City Hongo-dai, 2073-2, Iijima-cho, Sakae-ku, Yokohama-shi, Kanagawa-ken (JP), 244-0842; Akira Fujishima, 710-5, Nakamaruko, Nakahara-ku, Kawasaki-shi, Kanagawa-ken (JP), 211-0012; Kazuyuki Takami, Gifu (JP); Norihiro Nakayama, Gifu (JP); Taro Suzuki, Gifu (JP); Naoki Tanaka, Gifu (JP); Eisuke Tachibana, Gifu (JP); Tatsuhiko Adachi, Gifu (JP)

(73) Assignees: Ube Nitto Kasei Co., Ltd., Tokyo (JP); Toshiya Watanabe, Kanagawa-ken (JP); Kazuhito Hashimoto, Kanagawa-ken (JP); Akira Fujishima, Kanagawa-ken (JP)

( * ) Notice: Subject to any disclaimer, the term of this patent is extended or adjusted under 35 U.S.C. 154(b) by 0 days.

(21) Appl. No.: 09/807,904

(22) PCT Filed: Oct. 14, 1999

(86) PCT No.: PCT/JP99/05651

§ 371 (c)(1),
(2), (4) Date: Jun. 8, 2001

(87) PCT Pub. No.: WO00/23523

PCT Pub. Date: Apr. 27, 2000

(30) Foreign Application Priority Data

Oct. 22, 1998 (JP) ......................................... H10-301048
Mar. 24, 1999 (JP) ......................................... H11-79446
Sep. 17, 1999 (JP) ......................................... H11-264592

(51) Int. Cl.$^7$ .......................... B32B 5/14; B32B 27/00; B32B 27/16; B32B 27/30; B32B 31/26
(52) U.S. Cl. ................... 428/64.4; 428/220; 428/411.1; 428/500; 428/522; 427/256; 427/385.5; 525/105; 525/106

(58) Field of Search .................................. 428/220, 407, 428/411.1, 64.4, 323, 331, 328, 500, 522, 457; 427/256, 383.1, 385.5, 404, 407.1; 521/55, 75, 92, 96; 523/202, 203; 525/105, 106

(56) References Cited

U.S. PATENT DOCUMENTS 4,390,567 A * 6/1983 Liepins ........................ 427/214
5,096,442 A    3/1992 Arnett et al. ................ 523/212

FOREIGN PATENT DOCUMENTS

| JP | 5-500389 | 1/1993 |
| JP | 7-17772 | 1/1995 |
| JP | 8-283425 | 10/1996 |
| JP | 9-87526 | 3/1997 |
| JP | 9-131828 | 5/1997 |
| JP | 9-278938 | 10/1997 |
| JP | 11221880 A * | 8/1999 |
| WO | WO 91/18933 | 12/1991 |

OTHER PUBLICATIONS

Derwent Abstract 1999–511987, abstract of JP 11–221880A, Aug. 1999.*
Machine translation of JP 11–221880, Aug. 1999.*
English language translation of JP 8–283425, Oct. 1996.*
Machine assisted translation of JP 8–283425 A, Oct. 1996.*

* cited by examiner

Primary Examiner—Ramsey Zacharia
(74) Attorney, Agent, or Firm—Nixon & Vanderhye P.C.

(57) ABSTRACT

The present invention is concerned with an organic-inorganic composite graded material containing a composite material formed by chemically bonding an organic polymer compound and a metallic compound and having a component graded structure in which the content of the metallic compound continuously changes in the depth direction from the material surface, a process for the production of the above organic-inorganic composite graded material by forming a coating layer composed of a specific coating solution for forming the organic-inorganic composite film on an organic substrate and drying the coating layer under heat, a coating agent composed of the above organic-inorganic composite graded material for forming a coating film, and an article coated with the above coating agent.

26 Claims, 17 Drawing Sheets

Grading profile (Dip coating method)

Grading profile (Substrate: Ti-C system)

Grading profile (Case having no crosslinked point)

Grading profile (Substrate: glass)

Decrease in transmittance under irradiation with UV
(Case of organic-inorganic mixture system)

Decrease in transmittance under irradiation with UV
(Case of graded intermediate layer)

Change of transmittance with passage of time under irradiation with UV

Decrease in transmittance in sunshine weatherometer test (Case of graded intermediate layer on PMMA substrate)

Grading profile

Decrease in transmittance in sunshine weatherometer test
(Case of graded intermediate layer on PET film)

Decrease in transmittance in sunshine weatherometer test
(Case of graded intermediate layer treated with corona discharge)

Grading profile

Grading profile

Grading profile (change in inorganic component concentration)

Decrease in transmittance in sunshine weatherometer test
(Case having no chemical bond between PMMA and silica)

Decrease in transmittance in sunshine weatherometer test
(Case of commercially available undercoating layer on PMMA substrate)

Decrease in transmittance in sunshine weatherometer test
(Case of commercially available undercoating layer on PET film)

Grading profile

Grading profile

Grading profile

Grading profile

Grading profile

Grading profile

Grading profile

Grading profile

Grading profile

Grading profile

ORGANIC-INORGANIC COMPOSITE GRADED MATERIAL, METHOD FOR PREPARATION THEREOF AND USE THEREOF

TECHNICAL FIELD

The present invention relates to a novel organic-inorganic composite graded material, a process for the production thereof and its use. More specifically, the present invention relates to an organic-inorganic composite graded material comprising a chemical bond product in which an organic polymer compound and a metallic compound are chemically bonded to each other, having a component-graded structure in which the content of the metallic compound continuously varies along the thickness direction of the material and being useful as a functional material in various fields, a process for efficiently producing the above material, a coating agent made of the above graded material for forming a coating, such as a coating film, an adhesive for bonding an organic material to an inorganic or metallic material or an intermediate film to be interposed between an organic substrate and an inorganic or metallic material layer, and base materials or articles for which the above graded material is applied.

TECHNICAL BACKGROUND

In recent years, with a diversification of demands to performances and functions of organic polymer materials, it is difficult to comply with such demands with a single polymer compound, and a different material having different properties is added to a polymer compound to form a composite compound.

For example, it is general practice to disperse a reinforcing material in an organic polymer material to modify the physical properties of the polymer material. Specifically, an organic or inorganic fibrous material such as a carbon fiber, a glass fiber, a metal fiber, a ceramic fiber, an aramid fiber, etc., or a powdery inorganic filler of calcium carbonate, silica, alumina, etc., is added and homogeneously dispersed.

Further, studies are actively made by mixing different polymer compounds, optionally, together with a compatibilizer to form a polymer alloy which exhibits novel functions.

A graded functional material recently attracts attention, which material is a composite material obtained by gradually changing the composition of the material so that the properties of its front and reverse completely differ from each other. For example, a metal-ceramic composite graded functional material having both the heat resistance of ceramic and the strength of metal has been developed as an airframe material of a supersonic aircraft.

Such graded functional materials are classified into an inorganic graded material, an organic graded material and an organic-inorganic composite graded material. These graded functional materials are prepared by mixing a plurality of materials such as a plurality of inorganic materials of different kinds, a plurality of organic materials of different kinds or a combination of at least one organic material and at least one inorganic material and controlling these materials such that their distribution density, orientation, etc., differ from place to place. The graded functional materials can exhibit properties of a plurality of component materials. It is therefore expected that the above materials can be applied to the filed of aerospace industries, the field of automobiles, the field of electronics, the medical field, the field of energy and, further, the filed of shields against radiations and electromagnetic waves.

Meanwhile, since there was found a so-called Honda-Fujishima effect that water is photodecomposed into hydrogen and oxygen when a semiconductor such as titanium dioxide is used as a photoelectrode ("Kogyo Kagaku Zasshi", Vol. 72, pages 108 to 113 (1969)), studies have been vigorously made to develop photocatalysts and put them into practical use. For example, when semiconductor particles of titanium dioxide are excited with light having energy greater than their band gap, electrons are generated in a conduction band, and holes are generated in a valence band. The above photocatalysts utilize electron-hole pairs rich with energy.

Application of the above photocatalysts has been and is studied not only for deodorization, anti-fouling, an anti-microbial function and disinfection but also for decomposition and removal of various environmentally detrimental substances in drain or waste gas.

As photocatalysts, various compounds having semiconductive property are known. For example, there are known metal oxides such as titanium dioxide, iron oxide, tungsten oxide and zinc oxide and metal sulfides such as cadmium sulfide and zinc sulfide. Of these, titanium dioxide, particularly anatase type titanium dioxide, is useful as a practical photocatalyst. This titanium dioxide exhibits excellent photocatalysis when it absorbs light having a specific wavelength in an ultraviolet region included in usual light such as sunlight. Due to strong oxidation activity derived from the above photocatalysis, the titanium dioxide exhibits functions such as anti-fouling, deodorization, anti-microbial function, air-cleaning, water-cleaning and super-hydrophilicity.

Studies are being actively made at present to allow the photocatalyst such as titanium dioxide or the like to exhibit the above photocatalytic functions for their industrial utility. For example, when the photocatalyst is coated on a material surface or incorporated into a coating on a material surface in advance, it is possible to impart the material surface with the function of a decomposer of an organic substance only upon irradiation with light, and its practical use has begun for glass and tiles that are not easily soiled or a stool. Further, studies are being actively made for developing various functional articles utilizing the above photocatalyst. For example, studies are being made with regard to practical use of (1) construction materials capable of decomposing nitrogen oxide that constitutes a source of air pollution, with light energy of the sun, (2) glass having a surface coating made of a transparent photocatalyst, having capability of naturally decomposing an adhering soiling and having an anti-microbial effect, (3) a window film having a photocatalyst layer formed on its surface for utilizing the ultra-hydrophilic nature and an anti-fouling performance of the photocatalyst and being to be applied to a front surface side of a glass window and (4) a drain treating agent formed by coating silica gel particles with a fine titanium dioxide powder.

The photocatalysts having photocatalytic function such as titanium dioxide cannot be easily supported on an organic substrate such as a plastic substrate, and most of them require some binder. Further, when the photocatalyst is coated directly on an organic substrate or incorporated into such a substrate, there is caused a problem that the organic substrate inevitably deteriorates for a short period of time due to the photocatalysis.

For overcoming the above problem, attempts are made to form a coating film made of a photocatalyst such as titanium dioxide on the organic substrate through an organic adhesive. In this case, however, there is incurred an undesirable situation in which the adhesion between the binder and the photocatalyst decreases with the passage of time or opacification, an interference color, etc., are caused. Attempts are also made to form a coating film made of a photocatalyst such as titanium dioxide on the organic substrate through an inorganic adhesive. In this case, the adhesion to the substrate is not sufficient or the adhesive layer itself undergoes cracking, resulting in an undesirable situation in which the adhesion between the binder and the substrate decreases with the passage of time or opacification, an interference color, etc., are caused. Further, microcapsules formed by coating a photocatalyst such as titanium dioxide with silica have been developed, and attempts are made to incorporate the microcapsules into an organic substrate for imparting the organic substrate with deodorization and anti-microbial functions. In the above microcapsules, the photocatalyst is not easily exposed on a surface, so that the deterioration of the organic substrate is inhibited. Further, each capsule has a number of fine pores, and organic substances having small molecules can enter them, so that the catalytic function is effectively exhibited. However, the microcapsules having such a structure are difficult to improve in photocatalytic activity, and it is also difficult to fully apply the phenomenon of conversion to hydrophilic nature that is another characteristic feature of the photocatalyst. Further, the microcapsules had a defect that the production process thereof requires complicated procedures so that the production cost thereof is inevitably large.

On the other hand, it is general practice to form layers made of various inorganic or organic materials other than the above materials for photocatalytic activity, such as a conductive material, a hard coating agent, an optical recording material, a magnetic powder, an infrared-absorbing material, etc., on a plastic substrate to produce functional materials.

When the above inorganic or metallic material layer is formed on a plastic substrate, for example, there is often employed a method in which an inorganic primer layer is formed on the plastic substrate and the inorganic or metallic material layer is formed thereon, since the adhesion thereof to the substrate is generally insufficient. In this method, the adhesion between the inorganic primer layer and the inorganic or metallic material layer is good. However, the adhesion between the plastic substrate and the inorganic primer layer is not always sufficient, and there is involved a problem that the durability of the adhesion against heat is poor or that the adhesion decreases with the passage of time.

It has been therefore desired to develop a technique of forming an inorganic or metallic material layer on a plastic substrate with good adhesion.

Under the circumstances, it is an object of the present invention to provide an organic-inorganic composite graded material having a composition continuously changing in its thickness direction, which is useful as a novel functional material in various fields, such as a coating, an adhesive between an organic material and an inorganic or metallic material, an intermediate film which is formed between an organic substrate and a coating made of a photocatalyst and prevents deterioration of the organic substrate or an intermediate film for improving the adhesion between an organic substrate and an inorganic or metallic material, a process for efficiently producing the above material and a use thereof.

DISCLOSURE OF THE INVENTION

For achieving the above object, the present inventors have made diligent studies and as a result have found that an organic-inorganic composite material in which an organic polymer compound and a metallic compound are chemically bonded to each other, obtained by applying a coating solution, which is a mixture of an organic polymer compound having a metal-containing group capable of bonding to a metal oxide or metal nitride polymer compound by hydrolysis in a molecule with a metal compound capable of forming a metal oxide by hydrolysis or a metal nitride polymer compound, or a hydrolysis product of the above mixture, on an organic substrate and drying a formed coating under heat, is a novel organic-inorganic composite graded material having a component-graded structure in which the content of the metallic compound in the material continuously changes in the depth direction from the material surface, and is useful for the above use. The present invention has been accordingly completed on the basis of the above finding.

That is, the present invention provides:

(1) an organic-inorganic composite graded material in which an organic polymer compound and a metallic compound are chemically bonded to each other, and having a component-graded structure in which the content of the metallic compound in the material continuously changes in the depth direction from the surface of the material, (2) a coating agent made of the above organic-inorganic composite graded material for forming a film on a substrate, preferably, a coating agent for forming a coating film on an organic substrate, as an adhesive for bonding an organic material to an inorganic or metallic material and for forming an intermediate film to be interposed between an organic substrate and a coating layer containing at least an inorganic or metallic material, (3) a substrate using the above organic-inorganic composite graded material, (4) an organic-inorganic bonding material using the above organic-inorganic composite graded material as an adhesive, and (5) an article having the above organic-inorganic composite graded material interposed as an intermediate film and having a coating layer containing at least an inorganic or metallic material.

According to the present invention, further, the above organic-inorganic composite graded material can be produced by preparing a coating solution which is a mixture of (A) an organic polymer compound having a molecule containing a metal-containing group capable of bonding to a metal oxide or metal nitride polymer by hydrolysis with (B) (a) a metal compound capable of forming a metal oxide by hydrolysis or (b) a metal nitride polymer or preparing a hydrolysis product of the mixture, forming a coating film made of the above coating solution on a substrate made of an organic material and drying the coating film under heat.

BEST MODES FOR PRACTICING THE INVENTION

The organic-inorganic composite graded material of the present invention is an organic-inorganic composite material in which an organic polymer compound and a metallic compound are chemically bonded to each other, and a metallic compound, preferably, an organic-inorganic composite material formed of the above composite product, and which has a component-graded structure in which the content of the metallic compound in the material continuously changes in the depth direction from the material surface.

Figure 1:
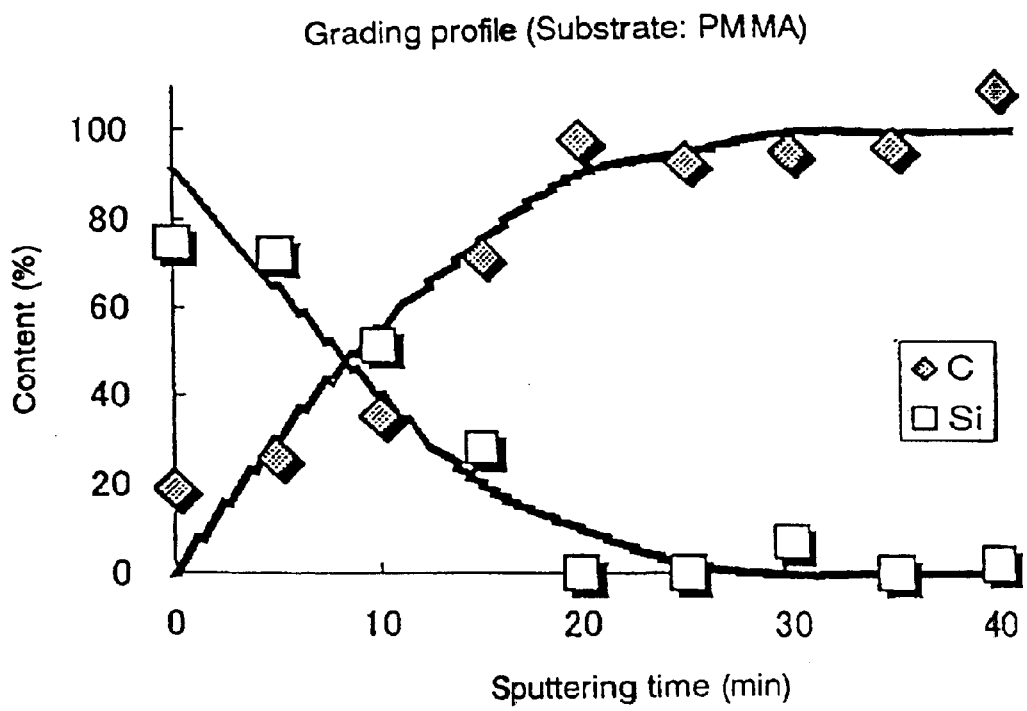
FIG. 1 is a graph showing a relationship between a sputtering time period and contents of carbon atoms and silicon atoms in an organic-inorganic composite film obtained in Example 1.

The above component-graded structure can be confirmed, for example, by sputtering a coating film surface of an organic-inorganic composite graded material formed on a substrate made of an organic material to scrape a film surface off, and measuring carbon atoms and metal atoms of film surfaces for contents with the passage of time by X-ray photoelectron spectroscopy or the like. A specific example will be explained. FIG. 1 is a graph showing a relationship between a sputtering time period and contents of carbon atoms and silicon atoms in a 0.6 μm thick coating film made of an organic-inorganic composite material (containing silicon atoms as metal atoms) formed on a polymethyl methacrylate substrate in Example 1 to be described later. As shown in this drawing, the coating film surface before the sputtering has a silicon atom content of nearly 100%. As the coating film surface is scraped off by the sputtering, the content of silicon atoms in the film surface decreases, and the content of carbon atoms increases. After the sputtering time period exceeds approximately 30 minutes, the film surface comes to be formed nearly of carbon atoms alone. That is, in the above graded material, it is shown that the content of the metal-oxide-containing compound in the material gradually decreases from the surface toward the substrate.

The organic-inorganic composite graded material of the present invention characteristically contains a composite product in which a metallic compound is chemically bonding to the organic polymer compound. The composite product based on the above chemical bond can be easily formed according to a process of the present invention to be described later.

The metallic compound in the graded material of the present invention is not specially limited in kind, and it can be a metal-oxide-containing compound or a metal-nitride-containing compound chemically bonded to an organic polymer compound through a metal-oxide-containing compound. The metallic compound is preferably a product formed by a sol-gel method. For example, such as metallic compound preferably includes oxides of metals selected from silicon, titanium, zirconium and aluminum. These metallic compounds may contain metal of one kind or metals of at least two kinds.

Although not specifically limited, the content of the above metallic compound in the graded material of the present invention is, as a metal oxide, generally in the range of from 5 to 98% by weight, preferably 20 to 98% by weight, particularly preferably 50 to 90% by weight. The polymerization degree and molecular weight of the organic polymer compound are not specially limited so long as the organic polymer compound can be formed into a film, and they can be selected as required depending upon kinds of polymer compounds and desired properties of coating films.

The graded material of the present invention preferably has a thickness of 5 μm or less, particularly preferably in the range of 0.01 to 1.0 μm, in view of gradient and performances of a coating film.

The above organic-inorganic composite graded material can be efficiently produced according to the following process of the present invention.

In the process of the present invention, first, a coating solution is prepared by mixing (A) an organic polymer compound having a metal-containing group (to be sometimes referred to as "hydrolyzable metal-containing group" hereinafter) capable of bonding to a metal oxide or a metal nitride polymer by hydrolysis with (B) (a) a metal compound (to be sometimes referred to as "hydrolyzable metal compound" hereinafter) capable of forming a metal oxide by hydrolysis or (b) a metal nitride polymer and optionally hydrolyzing the mixture.

Examples of the metal of each of the metal-containing group of the organic polymer compound as Component (A) which metal-containing group is capable of bonding to a metal oxide or a metal nitride polymer compound by hydrolysis, the metal compound capable of forming a metal oxide by hydrolysis which metal compound comes under Component (B)(a) and the metal nitride polymer which comes under Component (B)(b) preferably include silicon, titanium, zirconium and aluminum, and at least one of these is used.

The above organic polymer compound having a molecule containing a metal-containing group capable of bonding to a metal oxide or a metal nitride polymer by hydrolysis, which organic polymer compound is Component (A), can be obtained, for example, by copolymerization or condensation polymerization of a monomer having the above metal-containing group and a monomer containing no metal.

The above metal-containing group capable of bonding to a metal oxide or a metal nitride polymer by hydrolysis includes, for example, a group of the general formula (I),

$$—M^1R^1_{n-1} \qquad (I)$$

wherein $R^1$ represents hydrolyzable group(s) or non-hydrolyzable group(s), provided that at least one of them is required to be a hydrolyzable group capable of chemically bonding to Component (B) by hydrolysis and that when $R^1$ represents a plurality of groups, they may be the same as, or different from, each other, $M^1$ is a metal atom such as silicon, titanium, zirconium or aluminum, and n is a valence number of the metal atom $M^1$.

The hydrolyzable group capable of chemically bonding to Component (B) by hydrolysis, which hydrolyzable group comes under $R^1$ in the above general formula (I), includes, for example, an alkoxyl group, an isocyanate group, a halogen atom such as a chlorine atom, an oxyhalogen group and an acetylacetonate group. The non-hydrolyzable group that does not chemically bond to Component (B) preferably includes, for example, a lower alkyl group.

Examples of the metal-containing group of the above general formula (I) include trimethoxysilyl, triethoxysilyl, tri-n-propoxysilyl, triisopropoxysilyl, tri-n-butoxysilyl, triisobutoxysilyl, tri-sec-butoxysilyl, tri-tert-butoxysilyl, trichlorosilyl, dimethylmethoxysilyl, methyldimethoxysilyl, dimethylchlorosilyl, methyldichlorosilyl, triisocyanatosilyl, methyldiisocyanatosilyl, a trimethoxytitanium group, a triethoxytitanium group, a tri-n-propoxytitanium group, a triisopropoxytitanium group, a tri-n-butoxytitanium group, a triisobutoxytitanium group, a tri-sec-butoxytitanium group, a tri-tert-butoxytitanium group, a trichlorotitanium group, a trimethoxyzirconium group, a triethoxyzirconium group, a tri-n-propoxyzirconium group, a triisopropoxyzirconium group, tri-n-butoxyzirconium group, a triisobutoxyzirconium group, a tri-sec-butoxyzirconium group, a tri-tert-butoxyzirconium group, a trichlorozirconium group, a dimethoxyaluminum group, a diethoxyaluminum group, a di-n-propoxyaluminum group, a diisopropoxyaluminum group, a di-n-butoxyaluminum group, a diisobutoxyaluminum group, a di-sec-butoxyaluminum group, a di-tert-butoxyaluminum group and a trichloroaluminum group.

As an example of the above copolymerization, a monomer having an ethylenically unsaturated group and a metal-containing group of the above general formula (I) and a monomer having an ethylenically unsaturated group and containing no metal are radical-copolymerized, whereby a desired polymer compound can be obtained. Specifically, there can be employed a method in which at least one (meth)acrylate ester containing a metal-containing group and containing an alkyl group as an ester component, represented by the general formula (II),

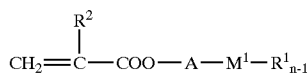
(II)

wherein $R^2$ is a hydrogen atom or methyl, A is an alkylene group, preferably an alkylene group having 1 to 4 carbon atoms, and $R^1$, $M^1$ and n are as defined above, and a monomer having an ethylenically unsaturated group, represented by the general formula (III),

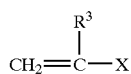
(III)

wherein $R^3$ is a hydrogen atom or methyl and X is a monovalent organic group, particularly preferably, at least one (meth)acrylate ester of the general formula (III-a),

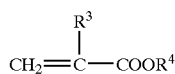
(III-a)

wherein $R^4$ is alkyl, cycloalkyl, aryl or aralkyl and $R^3$ is as defined above, are radical-polymerized.

As an example of the condensation polymerization, a desired polymer compound can be obtained by a method in which a monomer having groups capable of increasing a molecular weight by condensation, e.g., at least 2 functional groups that generate an amide bond, an ester bond or a urethane bond by condensation in place of the above ethylenically unsaturated group and having a metal-containing group of the above general formula (I) and a monomer having groups capable of increasing a molecular weight by condensation, e.g., at least 2 functional groups that generate an amide bond, an ester bond or a urethane bond by condensation and containing no metal-containing group are polycondensed.

Specifically, there can be employed a method in which an amine component and an acid component, one of which has a metal-containing group of the above general formula (I), are polycondensed to form a polyamide, or a method in which an alcohol component and an acid component, one of which has a metal-containing group of the above general formula (I), are polycondensed to form a polyester.

The metal compound (hydrolyzable metal compound) capable of forming a metal oxide by hydrolysis, which metal compound comes under the above Component (B)(a), includes, for example, a metal compound of the general formula (IV), $$M^2R^5_m \qquad (IV),$$

wherein $R^5$ represents hydrolyzable groups or non-hydrolyzable groups, provided that at least 2 groups of them are hydrolyzable groups and that at least one of them is a hydrolyzable group capable of chemically bonding to Component (A) by hydrolysis and further that a plurality of the groups represented by $R^5$ may be the same as, or different from, each other, $M^2$ is a metal atom such as silicon, titanium, zirconium or aluminum, and m is a valence number of the metal atom $M^2$.

Of the groups represented by $R^5$ in the above general formula (IV), the hydrolyzable group includes, for example, alkoxyl, an isocyanate group, a halogen atom such as a chlorine atom, an oxyhalogen group and an acetylacetonate group. The non-hydrolyzable group preferably includes, for example, lower alkyl, aryl and alkenyl.

As the above hydrolyzable metal compound, there can be also used an oligomer derived from the metal compound of the above general formula (IV) or a mixture of a plurality of metal compounds of the above general formula (IV).

Examples of the above metal compound of the above general formula (IV) include tetramethoxysilane, tetraethoxysilane, tetra-n-propoxysilane, tetraisopropoxysilane, tetra-n-butoxysilane, tetraisobutoxysilane, tetra-sec-butoxysilane, tetra-tert-butoxysilane, metal alkoxides corresponding thereto, such as tetraalkoxytitanium, tetralkoxyzirconium, trimethoxyaluminum, triethoxyaluminum, tri-n-propoxyaluminum, triisopropoxyaluminum, tri-n-butoxyaluminum, triisobutoxyaluminum, tri-sec-butoxyaluminum and tri-tert-butoxyaluminum, metal alkoxide oligomers such as commercially available alkoxysilane oligomers called "Methyl Silicate 51" and "Ethyl Silicate 40" (these are all trade names of commercial products manufactured by COLCOAT Co., Ltd.), tetraisocyanatosilane, methyltriisocyanatosilane, tetrachlorosilane and methyltrichlorosilane. As the above Component (B)(a), metal alkoxides are preferred. These may be used alone or in combination.

The metal nitride polymer as Component (B)(b) includes, for example, a polysilazane having a number average molecular weight of 100 to 50,000 and containing a structural unit of the general formula (V),

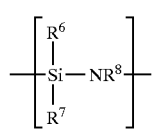
(V)

wherein each of $R^6$, $R^7$ and $R^8$ is independently a hydrogen atom, alkyl, alkenyl, aryl, aralkyl, a group in which a carbon atom of a fluoroalkyl other than these groups bonds directly to a silicon atom, alkylsilyl, alkylamino or alkoxyl, provided that at least one of them is a hydrogen atom.

When the process of the present invention uses metal alkoxide as Component (B)(a), a mixture of the polymer compound as Component (A) with the metal alkoxide as Component (B)(a) is hydrolyzed in a proper polar solvent such as an alcohol, a ketone or an ether in the presence of an acid such as hydrochloric acid, sulfuric acid or nitric acid or a cation exchange resin as a solid acid, generally, at a temperature of 0 to 60° C., preferably 20 to 40° C., the solid acid is removed when it has been used, and then, the solvent is distilled off or a solvent is added as required to adjust the mixture to a viscosity suitable for application, whereby a coating solution is prepared. When the temperature is too low, the hydrolysis does not proceed, and when it is too high, the hydrolysis proceeds to excess, and as a result, the gradient of a graded coating may decrease. There may be employed a constitution in which a polar solvent solution containing the metal alkoxide as Component (B)(a) is prepared beforehand, an acid is added thereto to proceed with the hydrolysis in advance, the thus-prepared mixture is mixed with Component (A) and the resultant mixture is further hydrolyzed.

Further, when an isocyanate-containing metal compound or a halogen-containing metal compound is used as Component (B)(a), or when Component (B)(b) is used, generally, the hydrolysis is not carried out before formation of a film, but there is employed a method in which the hydrolysis is carried out in the presence of water in air during or after the formation of a film.

Some kinds of inorganic components may gradually undergo hydrolysis and condensation polymerization and the coating conditions may be changed even after the preparation of the coating solution, so that a solid dehydrator insoluble in the coating solution, such as anhydrous magnesium sulfate, is added to the coating solution, whereby a decrease in the pot life thereof can be prevented. In this case, the above dehydrator is removed before use of the coating solution.

Then, the above-obtained coating solution is applied onto a substrate made of an organic material to form a coating film by a known method such as a dip coating method, a spin coating method, a spray coating method, a bar coating method, a knife coating method, a roll coating method, a blade coating method, a die coating method or a gravure coating method such that a dry coating film generally has a thickness of 5 $\mu$m or less or such that a dry coating film as an intermediate film preferably has a thickness in the range of from 0.01 to 1.0 $\mu$m, more preferably 0.02 to 0.7 $\mu$m, and the coating film is dried by a known method, for example, dried under heat at a temperature of approximately 40 to 150° C., whereby the organic-inorganic composite graded material of the present invention can be obtained.

In the present invention, when a mixture of Component (A) with the metal alkoxide coming under Component (B)(a) is hydrolyzed, the hydrolyzable metal-containing group of the polymer compound an Component (A) is hydrolyzed, and the metal alkoxide as Component (B)(a) is also hydrolyzed and partly polymerized. Then, the resultant coating solution is applied to a substrate made of an organic material (to be sometimes referred to as "organic substrate"), whereby a flexible polymer chain portion of the polymer compound as Component (A) is adsorbed on the substrate, and a hydrolysis portion of the metal-containing group as a side chain is present apart from the substrate. When this coating is dried under heat, the hydrolysis of the metal-containing group as a side chain further proceeds, and the hydrolysis and polymerization of the metal alkoxide as Component (B)(a) further proceed as well. And, in this case, a reactive group formed by the hydrolysis of the above side chain, for example, a silanol group and a hydrolysis and polymerization product of Component (B)(a) undergo condensation (chemical bonding), whereby a composite product in which the polymer compound and the metal-oxide-containing compound chemically bond to each other is formed.

Further, when a coating solution comprising a mixture of Component (A) with an isocyanate- or halogen-containing metal compound that comes under Component (B)(a) or with Component (B)(b) is applied to a substrate made of an organic material, a flexible polymer chain portion of the polymer compound as Component (A) is adsorbed on the substrate, and a hydrolyzable metal-containing group as a side chain is present apart from the substrate. In this coating film, the hydrolysis of the above hydrolyzable metal-containing group as a side chain proceeds during the formation of the coating film or after it is dried under heat, and a reactive group formed by the hydrolysis of the above side chain, for example, a silanol group and a hydrolysis product of an isocyanate- or halogen-containing metal compound as Component (B)(a) or the metal nitride polymer as Component (B)(b) chemically bond to each other, whereby a composite product is formed.

Therefore, the composite graded material of the present invention is fundamentally different from any graded composite material disclosed in JP-A-8-283425.

In the composite graded material of the present invention thus-formed on an organic substrate, the content of the metallic compound in the material is nearly 100% in the surface, gradually decreases toward the substrate and comes to be nearly 0% in a site near the substrate.

That is, the composite graded material of the present invention is generally made of a film-shaped substance formed on an organic substrate, and substantially, that surface of the film-shaped substance which is in contact with the organic substrate is formed of the organic polymer compound component and the other open surface thereof is formed of the metallic compound.

In the present invention, the composite graded material is formed according to the above scheme, so that it is essential to retain a liquid state of the thus-formed coating film for a time period for which the polymer chain portion is adsorbed on the substrate made of an organic material, generally, for several seconds after the coating film is formed by application.

Generally, a solvent in which an organic component is soluble and a solvent in which an inorganic component is soluble are different, and these solvents are required to have miscibility. In application with a coater or by a spraying method, preferably, the evaporation point of the above inorganic-component-soluble solvent is higher than the evaporation point of the above organic-component-soluble solvent for attaining a graded structure free of non-uniformity in thickness and excellent and also for causing the adsorption of the polymer compound to take place prior to the condensation of the inorganic component. One solvent may be used so long as it can dissolve both the organic component and the inorganic component.

The substrate made of an organic material is not specially limited. Examples of the substrate include a substrate made of an acrylic resin such as polymethyl methacrylate, a substrate made of a styrene resin such as polystyrene or an ABS resin, a substrate made of an olefin resin such as polyethylene or polypropylene, a substrate made of a polyester resin such as polyethylene terephthalate or polyethylene naphthalate, a substrate made of a polyamide resin such as 6-nylon or 6,6-nylon, a substrate made of a polyvinyl chloride resin, a substrate made of a polycarbonate resin, a substrate made of a polyphenylene sulfide resin, a substrate made of a polyphenylene ether resin, a substrate made of a polyimide resin and a substrate made of a cellulose resin such as cellulose acetate.

The above substrate may be surface-treated by an oxidation method or a surface-roughening method as required for improving the adhesion thereof to the graded material of the present invention. The above oxidation method includes, for example, a corona discharge treatment, a chromic acid treatment (wet), a flaming treatment, a hot air treatment and an ozone and ultraviolet light treatment. The surface-roughening method includes, for example, a sand blasting method and a solvent treatment method. The surface treatment method is selected as required depending upon the substrate.

Further, the substrate made of an organic material used in the present invention also includes a substrate made of a material other than any organic material, for example, a substrate that is made of a metal, glass, a ceramic or other inorganic or metallic material but has an organic surface coating.

The thus-obtained organic-inorganic composite graded material of the present invention has excellent gradient as described already and also has the following properties; (1) The property of alleviating a stress of thermal shrinkages or physical elongations of the substrate and an inorganic film, (2) the refractive index continuously changes, (3) the gradient can be controlled as required and easily depending upon a mixing ratio of the inorganic component and the organic component, and (4) the property of permitting the controlling of a surface structure based on the inorganic component during the formation of a film. The organic-inorganic composite graded material of the present invention is therefore useful in various fields.

According to the present invention, there is also provided a coating agent for forming a coating film made of the organic-inorganic composite graded material on a substrate.

The coating agent is preferably the already described coating solution prepared by mixing (A) an organic polymer compound having a metal-containing group capable of bonding to a metal oxide or a metal nitride polymer by hydrolysis with (B)(a) a metal compound capable of forming a metal oxide by hydrolysis or (b) a metal nitride polymer and optionally hydrolyzing the mixture.

The coating film can be used in the following fields.

First, the coating film is used as such. The organic-inorganic composite graded material has excellent adhesion to an organic substrate, and the surface of the coating film has the property of a metal oxide or a metal nitride, so that there can be obtained hard coating films that are excellent not only in scratch resistance and heat resistance but also in adhesion when coating layers made of the above material are formed on various plastic films.

Second, it is used in the field of adhesives.

The graded material of the present invention has excellent adhesion to an organic substrate as described above, and further, its surface is formed of a metallic compound, so that it has excellent adhesion to an inorganic or metallic material. The graded material of the present invention is therefore suitable as an adhesive between an organic material and an inorganic or metallic material.

Further, the coating film is used as an intermediate film interposed between an organic substrate and a coating layer containing at least an inorganic or metallic material.

When a coating layer containing an inorganic or metallic material is formed on an organic substrate, generally, the adhesion between the organic material and the coating layer is insufficient, and there is caused a problem that the coating layer is poor in durability, peels off after some time or is liable to peel off due to heat or moisture.

When the graded material of the present invention is interposed as an intermediate film between the above organic substrate and the above coating layer containing an inorganic or metallic material, the intermediate film has a gradient as described above, so that it is excellent in adhesion to the organic substrate and that it is also excellent in adhesion to the coating layer containing an inorganic or metallic material to be formed thereon. As a result, the coating layer containing an inorganic or metallic material can be formed on the organic substrate with remarkably good adhesion.

In the present invention, the thickness of the above intermediate film is generally 5 $\mu$m or less, preferably in the range of from 0.01 to 1.0 $\mu$m, more preferably 0.02 to 0.7 $\mu$m.

The above coating layer containing an inorganic or metallic material is not critical, and various coating layers can be formed. For example, it preferably includes (1) a photocatalytic material layer, (2) an inorganic or metallic electrically conductive material layer, (3) an hard coating layer containing an inorganic or metallic material, and (4) an inorganic or metallic optical recording material layer or an inorganic or metallic dielectric layer.

The coating layer containing an inorganic or metallic material will be explained below.

(1) Photocatalytic Material Layer

When a coating layer made of a photocatalytic material such as titanium dioxide is formed on an organic substrate surface, the photocatalysis thereof causes a problem that the organic substrate deteriorates for a short period of time. Attempts are therefore made to a coating layer made of a photocatalytic material such as titanium dioxide on an organic substrate through an inorganic binder which is less deteriorated due to photocatalysis. However, the inorganic binder has insufficient adhesion to an organic substrate and is therefore poor in durability.

When the graded material of the present invention is interposed as an intermediate film between an organic substrate and a coating layer made of a photocatalytic material, the intermediate layer has excellent adhesion to the organic substrate, and, since the surface of the intermediate film is formed nearly of the metallic compound, the intermediate film has excellent adhesion to the coating layer made of a photocatalytic material. Further, the deterioration of the intermediate film due to photocatalysis does not easily take place, and the organic substrate can be fully protected.

Further, the graded material of the present invention can be interposed as an intermediate film between a metal substrate having a surface formed of an organic coating film and a photocatalytic material layer. As discussed with regard to the above organic substrate, this intermediate film has excellent adhesion to the organic coating film and also has excellent adhesion to the coating layer made of a photocatalytic material, and further, the deterioration of the intermediate film due to photocatalysis does not easily take place, and the organic coating film can be fully protected. In such use, the intermediate film is suitable particularly for forming a photocatalytic material layer on a steel plate for automobiles which steel plate has a surface formed of an organic coating film.

A metal substrate having a surface formed of an organic coating film includes a substrate produced by forming an organic coating film on a metal substrate such as a cold rolling steel plate, a zinc-plated steel plate, an aluminum/zinc-alloy-plated steel plate, a stainless steel plate, an aluminum plate or an aluminum alloy plate.

When the graded material of the present invention is used as such an intermediate film, it is particularly effective when the photocatalytic material for forming a coating layer thereon is titanium dioxide having high photocatalysis.

(2) Inorganic or Metallic Electrically Conductive Material Layer

An organic substrate having a surface formed of an electrically conductive material layer, a plastic film in particular, is used in an electroluminescence device (EL device), a liquid crystal display device (LCD device), a solar cell, etc., and further, it is used as an electromagnetic wave shielding film or an anti-static film. The electrically conductive material for such a use is selected, for example, from inorganic or metallic electrically conductive materials including metal oxides such as indium oxide, tin oxide, zinc oxide, cadmium oxide and ITO (indium tin oxide) and metals such as gold, platinum, silver, nickel, aluminum and copper. From the above inorganic or metallic electrically conductive material, a thin film having a thickness of approximately 50 to 2,000 angstroms is generally formed on an organic substrate such as a plastic film by a known method such as a vacuum deposition method, a sputtering method, an ion plating method, or the like.

Since the thus-formed inorganic or metallic electrically conductive material layer is poor in adhesion to the organic substrate, the graded material of the present invention is interposed as an intermediate film between the organic substrate and the inorganic or metallic electrically conductive material layer, so that the adhesion between the organic substrate and the inorganic or metallic electrically conductive material layer can be improved. When a transparent electrically conductive film is required, the interposing of the intermediate film made of the graded material of the present invention impairs transparency in almost no case.

(3) Hard Coating Layer Containing Inorganic or Metallic Material

A hard coating film having an excellent surface hardness and having excellent scratch resistance and anti-wearing properties is widely used, for example, as a member applied to a window glass of an automobile or a building or a surface of a plastic board for a window, or it is also used for protection of a CRT display or a flat panel display.

On the other hand, a plastic lens is light in weight and excellent in safety, processability and stylishness as compared with a glass lens, so that it has been winning popularity in recent years. However, the plastic lens has a drawback that it is susceptible to scratching as compared with a glass lens, and it is general practice to coat its surface with a hard coating layer.

The material for the hard coating film or the above hard coating layer to be applied to a plastic lens is often selected, for example, from hard coating agents containing an inorganic or metallic material, such as a mixture containing alkyltrihydroxysilane, a partial condensation product thereof, colloidal silica and a silicon-modified acrylic resin, an organotrialkoxysilane hydrolysis condensate, a mixture of an alkoxysilane hydrolysis condensate with colloidal silica, and a mixture containing a metal selected from zirconium, aluminum or titanium, a chelate compound and a silicon-modified acrylic resin.

For forming a hard coating layer on an organic substrate such as a plastic film or a plastic lens, there is generally employed a method in which the above hard coating agent containing an inorganic or metallic material is applied onto the organic substrate by a known method such as a bar coating method, a knife coating method, a roll coating method, a blade coating method, a die coating method, a gravure coating method or a spray coating method so as to form a dry coating film having a thickness of approximately 1 to 30 μm and a formed coating is dried.

The thus-formed hard coating layer containing an inorganic or metallic material has poor adhesion to the organic substrate, and the graded material of the present invention is interposed as an intermediate layer between the organic substrate and the hard coating layer, so that the adhesion between the organic substrate and the hard coating layer containing an inorganic or metallic material can be improved. When the intermediate layer made of the graded material of the present invention is interposed in the plastic lens, the graded material of the present invention does not generally cause the transparency of the plastic lens to decrease or does not generally cause interference fringes to take place.

(4) Inorganic or Metallic Optical Recording Material Layer or Inorganic or Metallic Dielectric Layer In recent years, as an optical recording medium having features in rewritability, high density, large storage capacity and non-contact to a recording and reproducing head, there have been developed a magneto-optical disk for recording information by the use of magnetization reversal of a magnetic film with heat energy of a semiconductor laser, etc., and reading information by the use of a magneto-optical effect or a phase-change disk utilizing a phase change from a crystal phase to an amorphous phase, and these disks are practically used.

The above optical recording medium has a structure in which an optical recording material layer, a dielectric layer, a metal reflection layer, a protective layer, etc., are consecutively formed on a light-transmitting resin substrate (organic substrate) such as a polycarbonate or polymethyl methacrylate substrate, and a dielectric undercoat layer is sometimes formed between the substrate and the optical recording material layer.

For forming the optical recording material layer on the substrate, for example, an inorganic magneto-optical recording material such as Tb—Fe, Tb—Fe—Co, Dy—Fe—Co or Tb—Dy—Fe—Co or an inorganic phase-change type recording material such as TeOx, Te—Ge, Sn—Te—Ge, Bi—Te—Ge, Sb—Te—Ge, Pb—Sn—Te or Tl—In—Se is used. For forming the dielectric undercoat layer to be optionally formed between the substrate and the optical recording material layer, an inorganic material such as SiN, SiO, $SiO_2$ or $Ta_2O_5$ is used.

The above inorganic optical recording material layer or dielectric undercoat layer is generally formed by a known method such as a vacuum deposition method, a sputtering method or an ion plating method.

The thus-formed inorganic or metallic optical recording material layer or inorganic dielectric undercoat layer has poor adhesion to the light-transmitting resin substrate, and the graded material of the present invention is interposed as an intermediate layer between the light-transmitting resin substrate and the optical recording material layer or the dielectric undercoat layer, so that the adhesion between the substrate and the optical recording material layer or the dielectric undercoat layer can be improved.

The coating layer containing an inorganic or metallic material further includes an inorganic infrared absorbent layer and a metal-deposited magnetic layer, such as layers made of titanium oxide, zinc oxide, indium oxide, tin oxide, zinc sulfide, antimony-doped tin oxide (ATO) and tin-doped indium oxide (ITO).

According to the present invention, there are further provided a substrate using the above organic-inorganic composite graded material, an organic-inorganic adhesive material using the above composite graded material as an adhesive and an article having an interposed intermediate layer made of the above composite graded material and having a coating layer containing at least an inorganic or metallic material.

The above substrate preferably includes an organic substrate having an interposed intermediate layer made of the organic-inorganic composite graded material of the present invention and having a coating layer containing at least an inorganic or metallic material and a metallic substrate having an interposed intermediate layer made of the organic-inorganic composite graded material of the present invention, having a photocatalytic material layer and having a surface formed of an organic coating film.

Specific examples of the above article preferably includes articles whose coating layer containing at least an inorganic or metallic material is (1) a photocatalytic material layer, (2) an inorganic or metallic electrically conductive material layer, (3) a hard coating layer containing an inorganic or metallic material and (4) an inorganic or metallic optical recording material layer or an inorganic or metallic dielectric layer.

In addition to the above use, the use of the organic-inorganic composite graded material of the present invention includes:

(1) an intermediate film for a ferroelectric thin film (barium titanate, lead titanate, strontium titanate, etc.), (2) an intermediate film for a UV cut film made of a thin metal deposition film, (3) an intermediate film for a heat ray shielding film made of a thin metal deposition film, (4) an intermediate film for a low-reflection or reflection-free coating film made of a silica-titania laminated film, (5) an intermediate film for a head-up display combiner film made of a silica-titania laminated film, (6) an intermediate film for a thin film formed by doping an inorganic oxide with functional molecules by a sol-gel method (a thin film formed of a dispersion of a fluorescence dyestuff, a dyestuff for a laser, a photochromic material, an electrochromic material or a non-linear optical material in an inorganic component such as silica), (7) an inorganic anti-microbial undercoat material for application, (8) use as to an immobilizing membrane for chemically bonding molecules of an enzyme, an antibody, a protein, etc., by a coupling reaction using OH groups on the surface of the graded film whose inorganic component is silica, (9) use as a reactive site of a silane coupling agent, a titanate coupling agent, aluminate coupling agent or a zirconate coupling agent using OH groups of silica on a graded film surface,

(10) use as a grafting reaction site for bonding a polymerizable functional group on the basis of use of OH group of silica on a graded film surface,

(11) an anti-corrosive coating for a plastic (titania, alumina, zirconia and a composite oxide of titania-silica, alumina-silica or zirconia-silica),

(12) a heat-resistant coating for a plastic,

(13) a coating for preventing bleeding of a plastic surface (prevention of bleeding of an additive out onto a surface of a plastic),

(14) an anti-oxidation film on a plastic surface,

(15) an optical fiber made of a transparent resin as a core layer and a graded film as a cladding layer, and

(16) a rod lens which is the same as the above except that the transparent resin is formed into a rod having a large diameter.

The present invention will be explained more in detail with reference to Examples hereinafter, while the present invention shall not be limited by these Examples.

EXAMPLE 1

(1) Formation of Organic-inorganic Composite Film 11.8 Grams of methyl methacrylate (supplied by Wako-Purechemical Ind. Co., Ltd.) and 0.5 g of 3-methacryloxypropyltrimethoxysilane (supplied by Shin-etsu Chemical Co., Ltd.) were mixed, and the mixture was fully stirred. Then, 0.2 g of 2,2'-azobisisobutyronitrile (supplied by Wako-Purechemical Ind. Co., Ltd.) was added thereto, and the mixture was allowed to react with stirring at 70° C. for 2.5 hours. After completion of the reaction, the reaction mixture was cooled to room temperature, a polymerizate was dissolved in 246 ml of acetone, and further, 123 ml of ethanol was added, to obtain a solution of an organic polymer compound (to be referred to as "polymer solution" hereinafter) as Component (A).

Separately, to 61.5 ml of tetraethoxysilane (supplied by Wako-Purechemical Ind. Co., Ltd.) was dropmise added 30.8 ml of a hydrochloric acid-isopropanol solution having a hydrochloric acid concentration of 0.05 g/ml with stirring, and the mixture was continuously stirred at room temperature for 5 hours. This inorganic component solution was gently dropwise added to the above-obtained polymer solution, and the mixture was stirred at room temperature for 4 hours and then diluted with 515 ml of acetone. The resultant mixture was fully stirred and further diluted with 738 ml of ethanol, to obtain a coating solution.

The above coating solution was applied onto a polymethyl methacrylate substrate by a spin coating method (1,500 rpm, 10 seconds), and the thus-formed coating was dried under heat at 70° C. for 12 hours, to give an organic-inorganic composite film having a thickness of 0.6 μm.

(2) Evaluation (a) Graded-ness

The organic-inorganic composite film obtained in the above (1) was subjected to argon-sputtering (4 kV) at intervals of 5 minutes with an XPS apparatus "PHI-5600" (supplied by ULVAC-PHI Incorporated) to scrape layers off, and carbon atoms and silicon atoms in the film surface were measured for contents by an X-ray photoelectron spectroscopy to study a gradient.

FIG. 1 shows, as a graph, a relationship between a sputtering time period (relating to depths of the film) and contents of the carbon atoms and the silicon atoms. FIG. 1 shows that the organic-inorganic composite film has excellent gradient.

(b) Durability in Use of Intermediate Film for Titanium Dioxide Film

The organic-inorganic composite film obtained in the above (1) was used as an intermediate film, and a photocatalyst coating agent prepared by diluting "STS-01" (supplied by Ishihara Sangyo K.K.) three times with distilled water was applied thereto by a spin coating method (1,500 rpm, 10 seconds), and the thus-formed coating was dried at 70° C. for 12 hours, to form a titanium dioxide coating film having a thickness of 0.4 μm.

The above coating film was placed in a hermetically closed silica glass container, and the atmosphere in the container was adjusted to a temperature of 60° C. and a relative humidity of 50%. Then, the coating film was exposed to black light (light quantity 2.0 mW/cm$^2$), to study a change of transmittance to visible light (400 to 800 nm) caused by irradiation with ultraviolet light with the passage of time.

Figure 12:
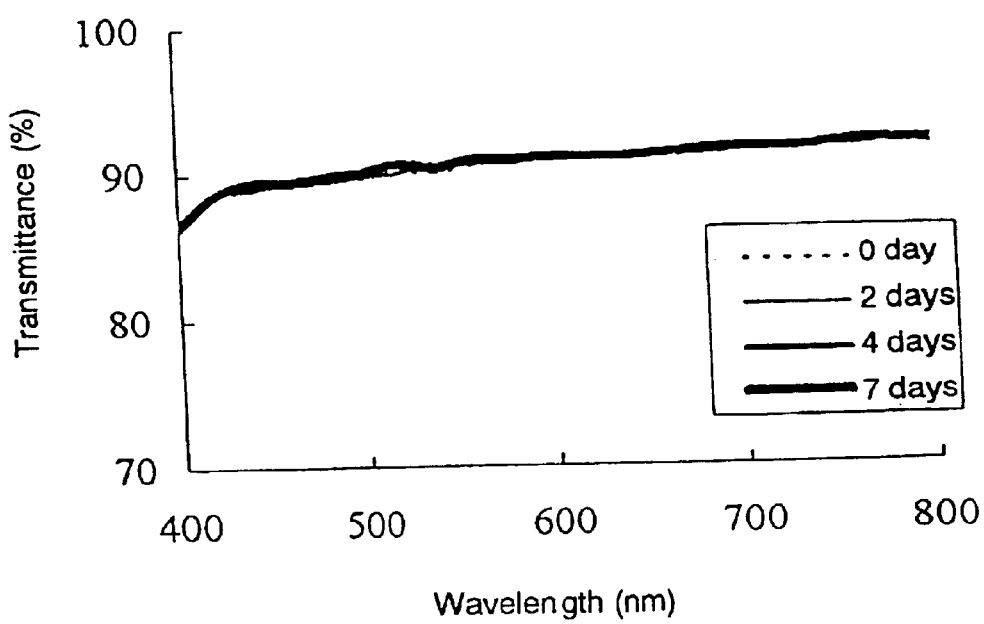
FIG. 12 is a graph showing a change of transmittance spectrum with the passage of time in a visible light region in an organic-inorganic composite film obtained in Example 1.

FIG. 12 shoes a change of transmittance spectrum of the above film in a visible light region with the passage of time.

Further, on the basis of a change of transmittance at a wavelength of 500 nm with the passage of time based on the time period for ultraviolet light irradiation, a decrease rate of the above transmittance was expressed as a value, and thus-obtained value was used as an index for evaluation of durability.

Figure 13:
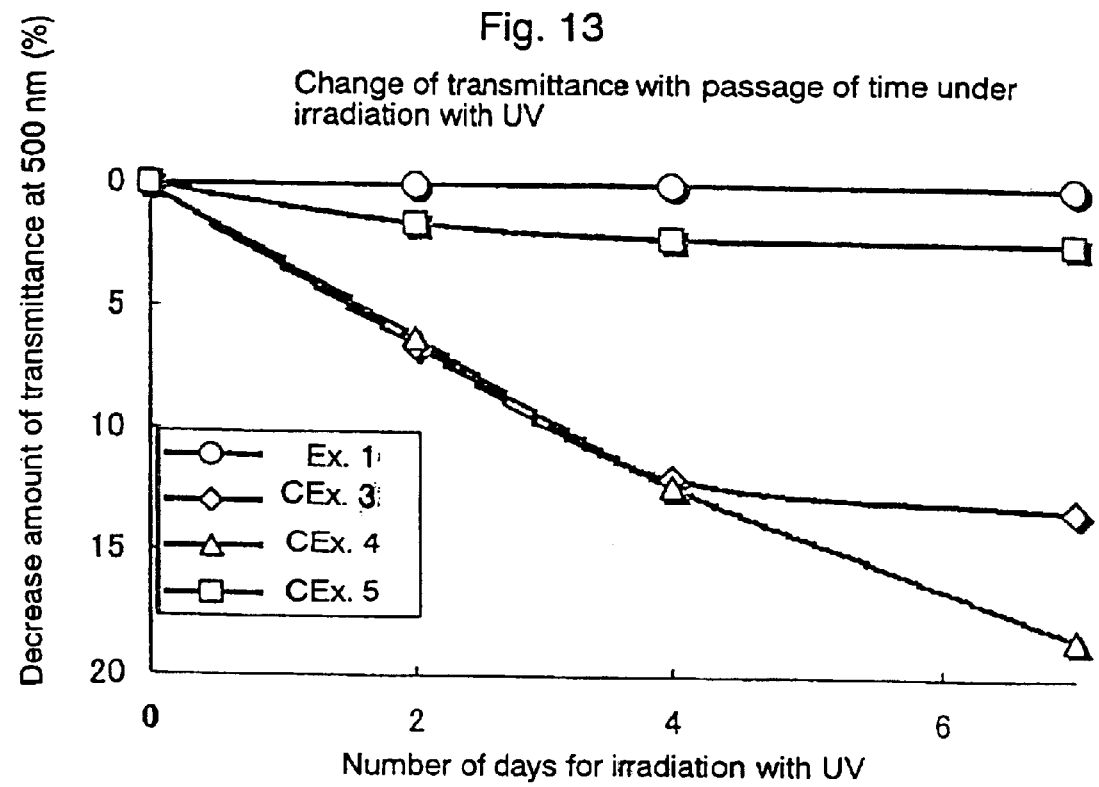
FIG. 13 is a graph showing a relationship between a number of days for irradiation with ultraviolet light and a drop rate of transmittance at a wavelength of 500 nm in each of the organic-inorganic composite film obtained in Example 1 and the coating films obtained in Comparative Examples 3 to 5.

FIG. 13 is a graph showing a relationship between the number of days for irradiation with ultraviolet light and a decrease amount of transmittance at a wavelength of 500 nm.

FIGS. 12 and 13 show that the above composite film has excellent durability.

<Accelerated Exposure Test>

Figure 14:
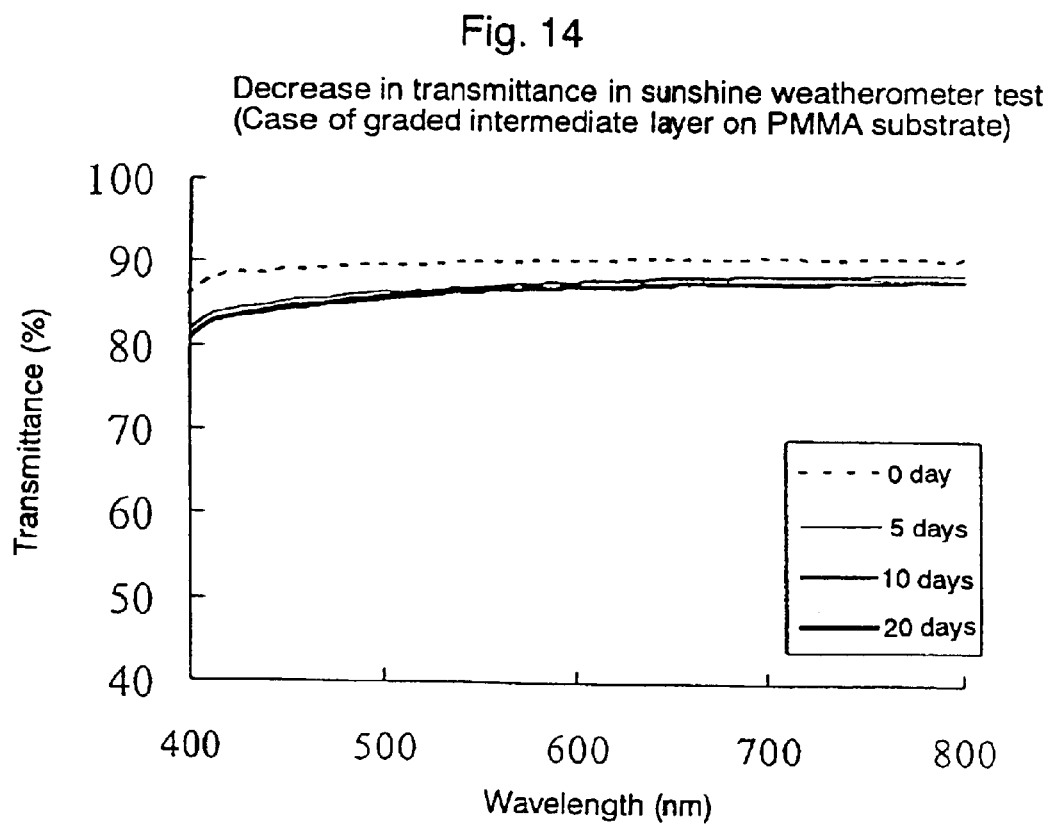
FIG. 14 is a graph showing a change of visible light transmittance in an exposure test of a film having an organic-inorganic composite film as an intermediate film and a coating film made of titanium dioxide, obtained in Example 1, with a sunshine weatherometer.

Further, the above film was subjected to an accelerated exposure test with a sunshine weatherometer (in-machine temperature: 60° C., spray cycle: 18 minutes out of 120 minutes) to study a degree of degradation caused by the photocatalyst on the basis of a change in light transmittance and a change in appearance. FIG. 14 shows a change in visible light transmittance on the basis of exposure time periods in the sunshine weatherometer. The light transmittance at 500 nm was 90% before the test and 87% after 20 days, or the light transmittance before the test was nearly maintained, and no change was found on the appearance. The film exhibited excellent weatherability.

EXAMPLE 2

An organic-inorganic composite film was formed in the same manner as in Example 1 except that the polymethyl methacrylate substrate was replaced with a polystyrene substrate. This film was evaluated for a gradient in the same manner as in Example 1.

Figure 2:
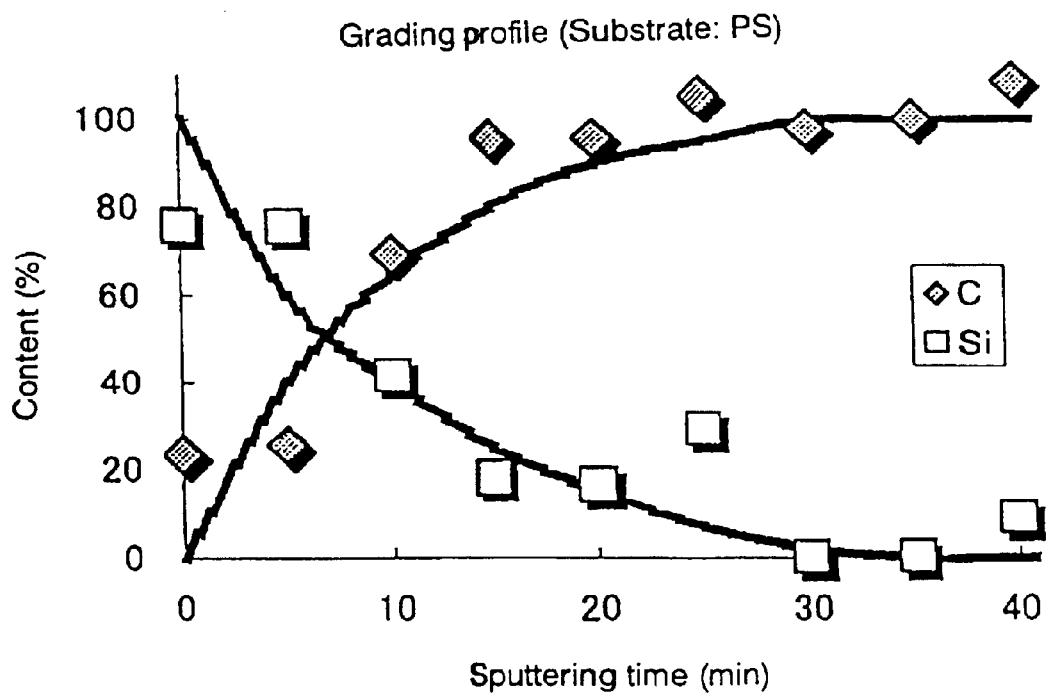
FIG. 2 is a graph showing a relationship between a sputtering time period and contents of carbon atoms and silicon atoms in an organic-inorganic composite film obtained in Example 2.

FIG. 2 shows, as a graph, a relationship between a sputtering time period and contents of the carbon atoms and the silicon atoms. FIG. 2 shows that the organic-inorganic composite film has excellent gradient.

EXAMPLE 3

An organic-inorganic composite film was formed in the same manner as in Example 1 except that the polymethyl methacrylate substrate was replaced with a polyethylene terephthalate film. This film was evaluated for a gradient in the same manner as in Example 1.

Figure 3:
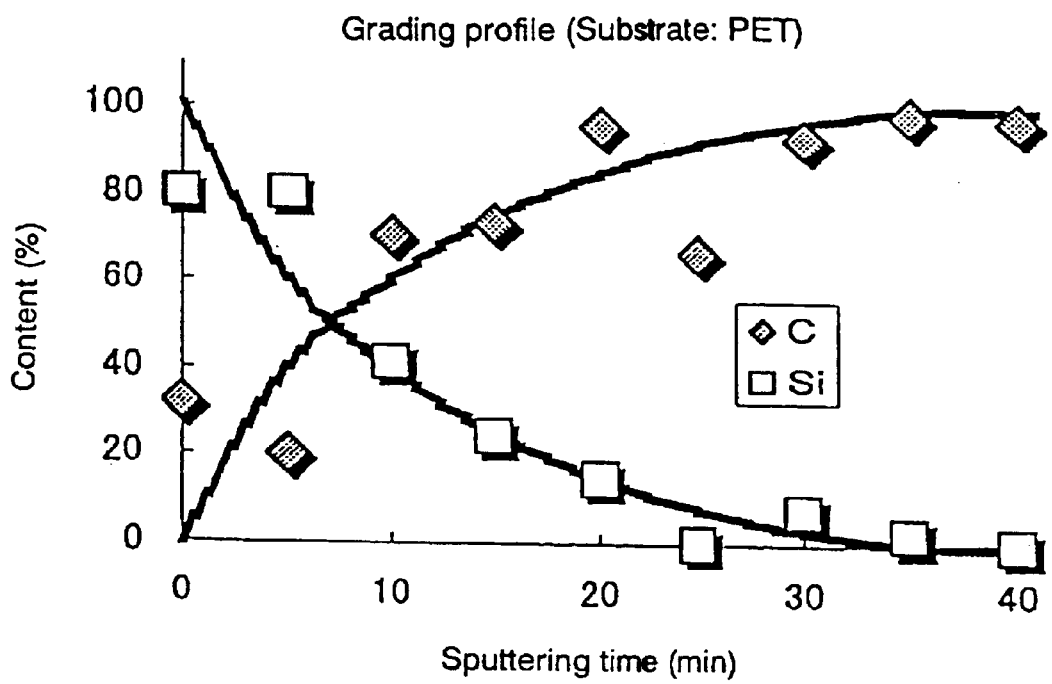
FIG. 3 is a graph showing a relationship between a sputtering time period and contents of carbon atoms and silicon atoms in an organic-inorganic composite film obtained in Example 3.

FIG. 3 shows, as a graph, a relationship between a sputtering time period and contents of the carbon atoms and the silicon atoms. FIG. 3 shows that the organic-inorganic composite film has excellent gradient.

EXAMPLE 4

An organic-inorganic composite film was formed in the same manner as in Example 1 except that the polymethyl methacrylate substrate was replaced with a polypropylene film. This film was evaluated for a gradient in the same manner as in Example 1.

Figure 4:
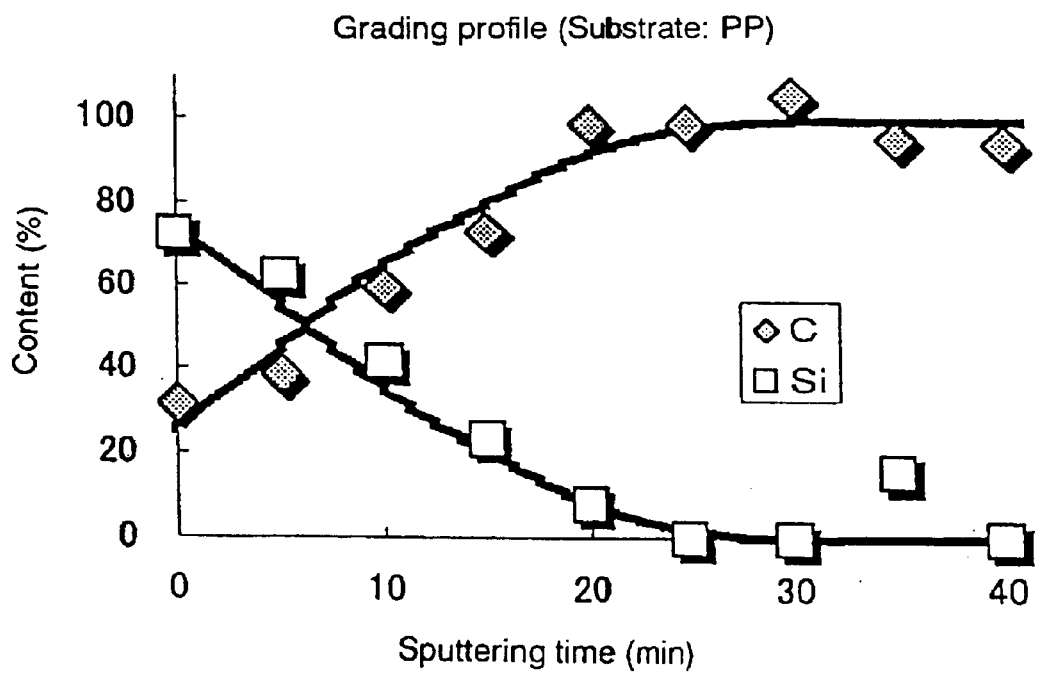
FIG. 4 is a graph showing a relationship between a sputtering time period and contents of carbon atoms and silicon atoms in an organic-inorganic composite film obtained in Example 4.

FIG. 4 shows, as a graph, a relationship between a sputtering time period and contents of the carbon atoms and the silicon atoms. FIG. 4 shows that the organic-inorganic composite film has excellent gradient.

EXAMPLE 5

An organic-inorganic composite film was formed in the same manner as in Example 1 except that a coating solution prepared by diluting the coating solution 5 times with an ethanol/acetone mixed solvent (volume ratio 1/1) was used in place of the coating solution used in Example 1 and that the spin coating method was replaced with a dip coating method (elevating rate 0.5 cm/minute). This film was evaluated for a gradient in the same manner as in Example 1.

Figure 5:
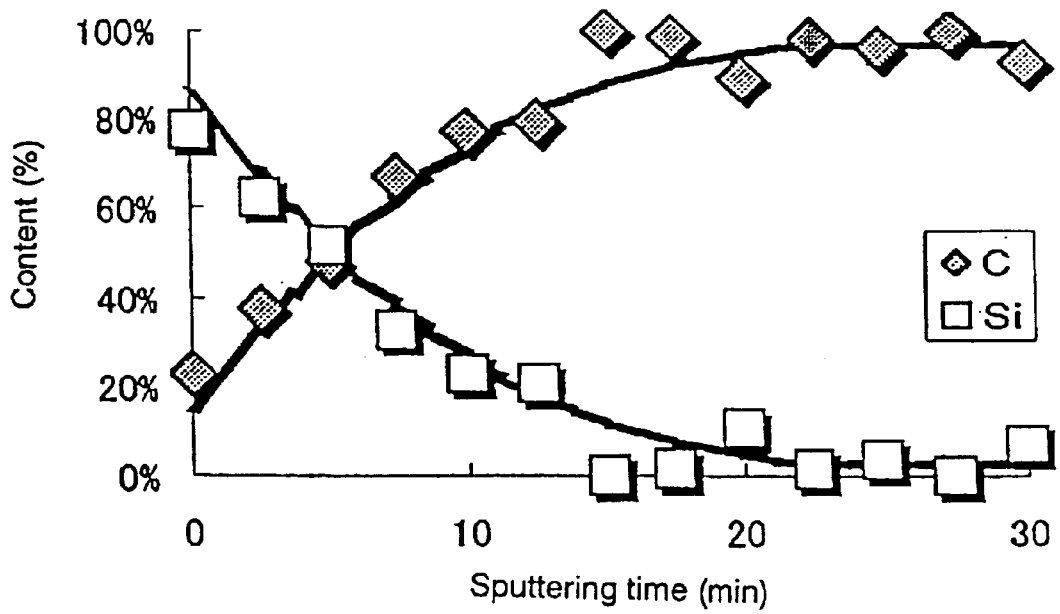
FIG. 5 is a graph showing a relationship between a sputtering time period and contents of carbon atoms and silicon atoms in an organic-inorganic composite film obtained in Example 5.

FIG. 5 shows, as a graph, a relationship between a sputtering time period and a content of the carbon atoms and the silicon atoms. FIG. 5 shows that the organic-inorganic composite film has excellent gradient.

EXAMPLE 6

An organic-inorganic composite film was formed in the same manner as in Example 1 except that 61.5 ml of tetraethoxysilane was replaced with 84.0 ml of tetraisopropoxytitanium [supplied by Wako-Purechemical Ind. Co., Ltd.). This film was evaluated for a gradient in the same manner as in Example 1.

Figure 6:
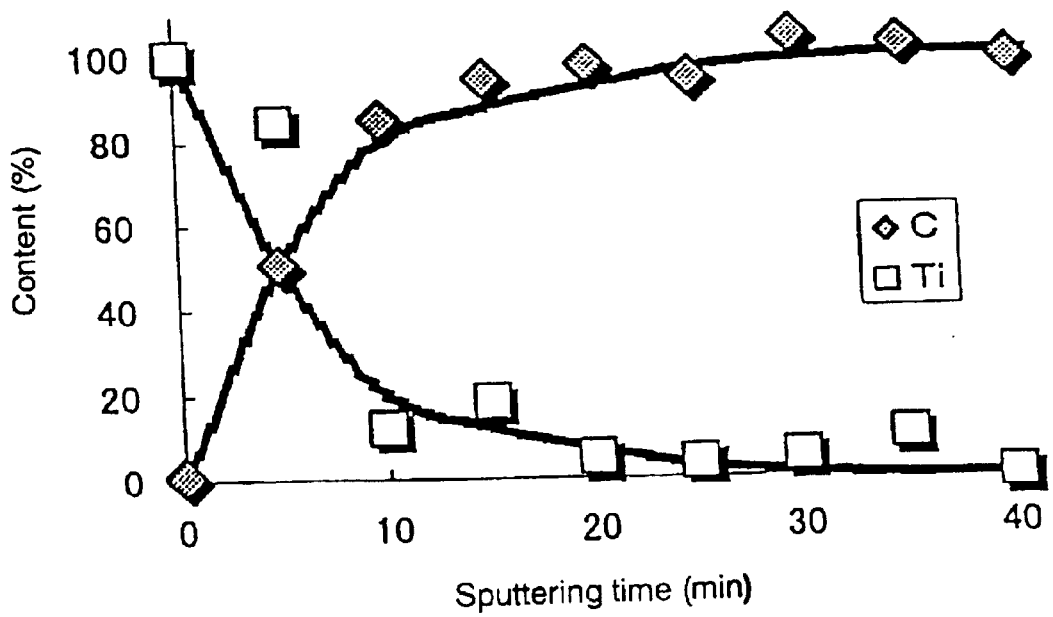
FIG. 6 is a graph showing a relationship between a sputtering time period and contents of carbon atoms and titanium atoms in an organic-inorganic composite film obtained in Example 6.

FIG. 6 shows, as a graph, a relationship between a sputtering time period and contents of the carbon atoms and the titanium atoms. FIG. 6 shows that the organic-inorganic composite film has excellent gradient.

EXAMPLE 7

An organic-inorganic composite film was formed in the same manner as in Example 1 except that the polymethyl methacrylate substrate was replaced with a polycarbonate substrate ("Iupilon" supplied by Mitsubishi Engineering Plastic Co., Ltd., thickness 400 $\mu$m). This film was evaluated for a gradient in the same manner as in Example 1.

Figure 15:
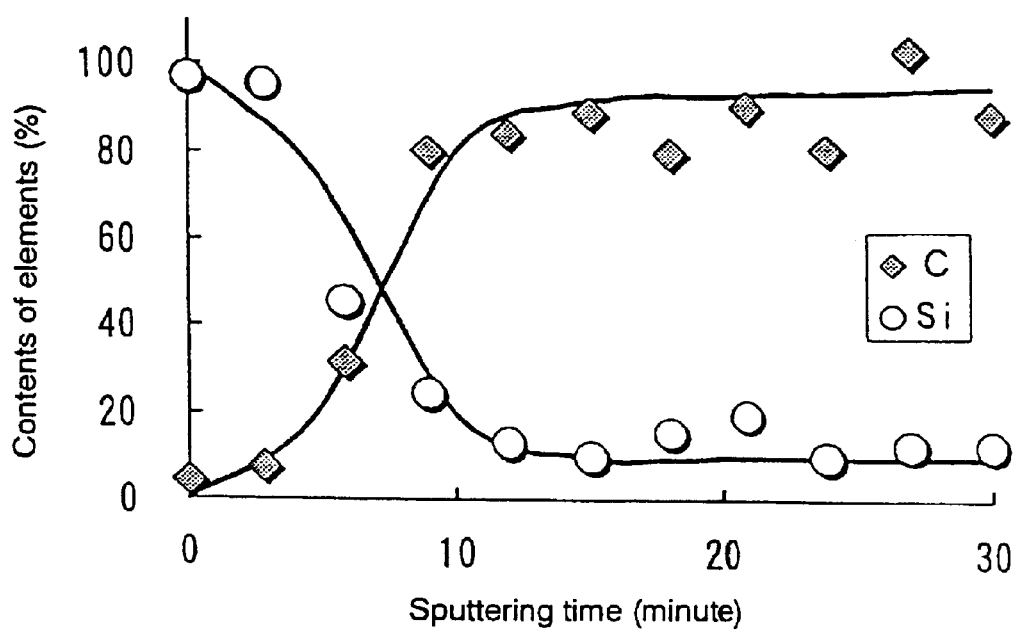
FIG. 15 is a graph showing a relationship between a sputtering time period and contents of carbon atoms and silicon atoms in an organic-inorganic composite film obtained in Example 7.

FIG. 15 shows, as a graph, a relationship between a sputtering time period and contents of the carbon atoms and the silicon atoms. FIG. 15 shows that the organic-inorganic composite film has excellent gradient.

EXAMPLE 8

(1) Formation of Organic-inorganic Composite Film

[Preparation of Component (A)]

10.92 Grams of methyl methacrylate [supplied by Wako-Purechemical Ind. Co., Ltd. (to be sometimes abbreviated as "MMA" hereinafter)] and 2.71 g of 3-methacryloxypropyltrimethoxysilane [supplied by Shin-etsu Chemical Co., Ltd. (to be sometimes referred to as "MPTMS" hereinafter)] were placed in a 100 ml container made of glass, mixed and fully stirred. Then, 0.2 g of 2,2'-azobisisobutyronitrile (supplied by Wako-Purechemical Ind. Co., Ltd.) was added thereto, and the container was hermetically closed with a lid. The container was placed in a water bath, and the mixture was allowed to undergo a radical polymerization with stirring with a magnetic stirrer at 70° C. for 2.5 hours. After completion of the reaction, a polymerizate was cooled to room temperature, and 1.0 g of the polymerizate was dissolved in 100 ml of acetone to give a solution of an organic polymer compound (to be referred to as "polymer solution" hereinafter) as Component (A).

[Preparation of Component (B)]

A solution containing 3.1 g of concentrated hydrochloric acid and 5 ml of ethanol was gradually dropwise added to a solution of 12 g of tetraethoxysilane [supplied by Wako-Purechemical Ind. Co., Ltd. (to be sometimes referred to as "TEOS" hereinafter) in 10 ml of ethanol with stirring. This mixture solution was stirred at room temperature for 5 hours, to obtain an inorganic component solution as Component (B).

[Preparation of Graded Film Coating Solution]

Ten milliliters of the polymer solution was diluted with 40 ml of acetone, and the diluted solution was fully stirred.

Then, 40 ml of ethanol was added, further, 10 ml of the inorganic component solution was added, and the mixture was stirred to obtain a graded film coating solution.

[Spin Coating for Graded Film]

A 12 cm×12 cm polyethylene terephthalate (PET) film (Lumirror T-60, supplied by Toray Ind. Inc., film thickness 188 μm) was fixed on a rotary cup of a spin coater, and the above graded film coating solution was placed on the film so as to wet the film surface. Five minutes after the entire film was wetted, the rotary cup was turned at 1,500 rpm for 10 seconds to spin coat the coating solution. The coated film was dried under heat in an oven at 70° C. for 12 hours to form a 0.2 μm thick organic-inorganic composite film on the PET film.

(2) Ammonia Treatment

The above film was immersed in 0.05 N aqueous ammonia for 5 minutes and then dried under heat at 70° C. for 12 hours.

(3) Evaluation

[Application of Photocatalyst Titanium Oxide Coating Agent]

A titanium oxide photocatalyst coating agent (BISTRATER NDC-200C, supplied by Nippon Soda Co., Ltd.) was diluted 10 times with isopropanol, and the diluted liquid was applied on the above organic-inorganic composite film by a spin coating method (1,500 rpm, 20 seconds), and the coated film was dried and heat treated in an oven at 80° C. for 12 hours, to form a titanium oxide coating film having a thickness of 0.15 μm.

[Accelerated Exposure Test]

Figure 16:
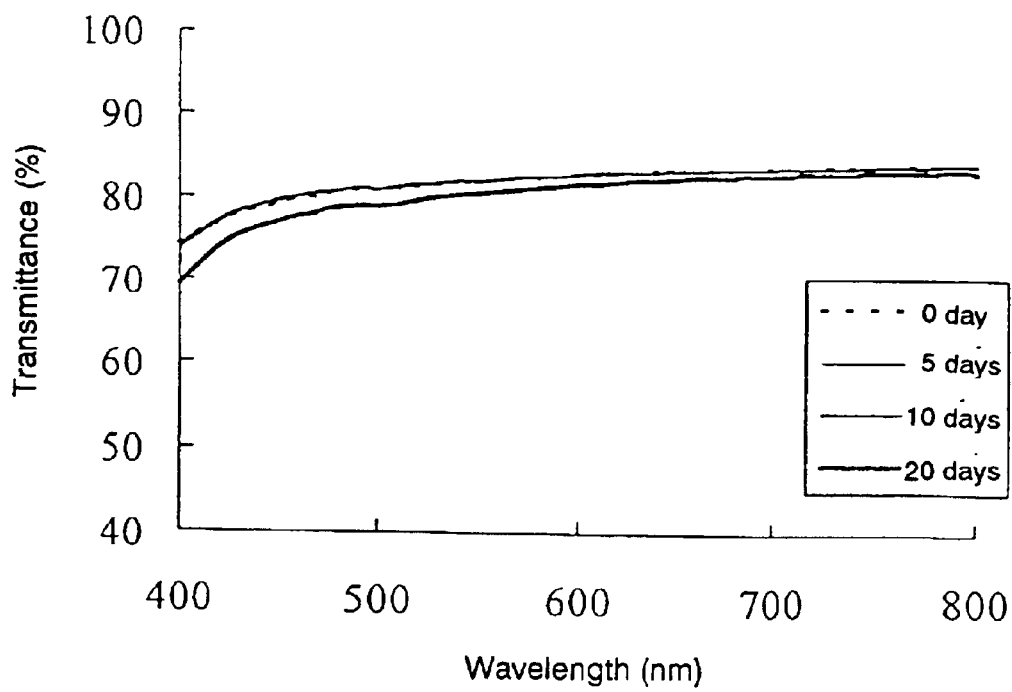
FIG. 16 is a graph showing a change of visible light transmittance in an exposure test of a film having an organic-inorganic composite film as an intermediate film and a coating film made of titanium dioxide, obtained in Example 8, with a sunshine weatherometer.

The above film coated with the photocatalyst titanium oxide was subjected to an accelerated exposure test using a sunshine weatherometer (in-machine: 60° C., spray cycle: 18 minutes out of 120 minutes) to study a degree of deterioration caused by the photocatalyst on the basis of a change in light transmittance and a change in appearance. FIG. 16 shows a change in visible light transmittance on the basis of exposure time periods in the sunshine weatherometer. The light transmittance at 500 nm before the test was 81%, and it was nearly maintained since the light transmittance after 20 days was 79%. Further, no change in appearance was found, and the above film exhibited excellent weathering resistance.

The film coated in the above (1) was heat-treated in an autoclave under conditions of 130° C. and 1.7 kgf/cm$^2$ for 3 hours, and the above photocatalyst titanium oxide coating agent was applied to the heat-treated film in the same manner as above. The thus coated film was subjected to an exposure test with a sunshine weatherometer to show an excellent result similar to the results of the ammonia-treated film.

EXAMPLE 9

[Corona Discharge Treatment of Graded Intermediate Film]

Figure 17:
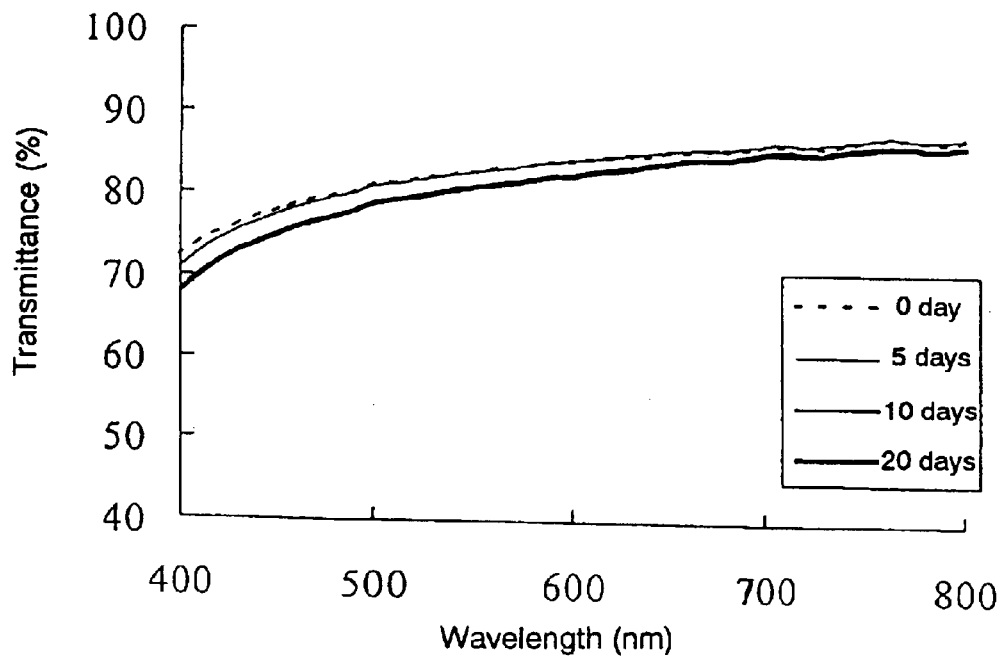
FIG. 17 is a graph showing a change of visible light transmittance in an exposure test of a film having an organic-inorganic composite film as an intermediate film and a coating film made of titanium dioxide, obtained in Example 9, with a sunshine weatherometer.

A film coated with a photocatalyst titanium oxide was obtained in the same manner as in Example 8 except that, after the graded film coating solution was coated on a PET film (Lumirror T-60, supplied by Toray Ind. Inc., film thickness 188 μm), the thus-coated film was treated with a corona discharge treating apparatus (supplied by Kasuga Denki K.K., applied voltage 150 V, a current 15A) for 3 seconds. This film was subjected to an accelerated exposure test with a sunshine weatherometer. FIG. 17 shows a change in visible light transmittance on the basis of exposure time periods in the sunshine weatherometer. The light transmittance before the test was 81%, and it was nearly maintained since the light transmittance after 20 days was 79%. Further, no change in appearance was found, and the above film exhibited excellent weathering resistance.

EXAMPLE 10

Figure 18:
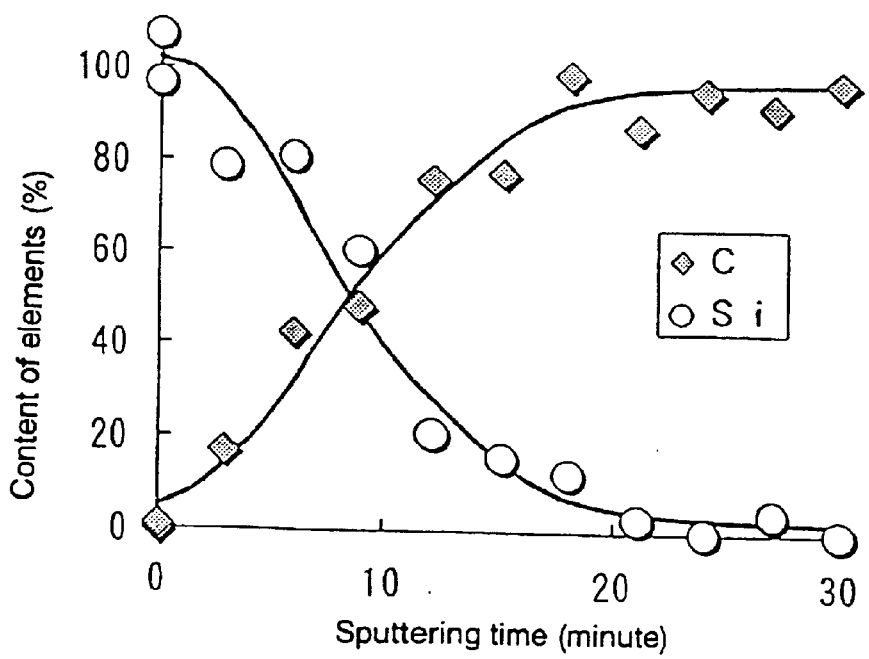
FIG. 18 is a graph showing a relationship between a sputtering time period and contents of carbon atoms and silicon atoms in an organic-inorganic composite film obtained in Example 10.

In Example 8, the MMA/MPTMS molar ratio was changed to 10/1, and a solution of 10 g/l of Component (A) in acetone was prepared. Separately, a mixture of 12 g of TEOS, 2.5 g of concentrated hydrochloric acid and 5 g of ethanol was dropwise added, and the mixture was stirred for 10 hours, to prepare an inorganic component solution. 3 Milliliters of Component (A) solution, 22 ml of acetone and 4 ml of the inorganic component solution were mixed, further, 21 ml of n-hexanol was added, and the mixture was fully stirred. A PET film was dipped in the resultant solution and elevated at a rate of 15 cm/minute to form a coating. This coating film was measured for a gradient in the same manner as in Example 1. FIG. 18 shows a relationship between a sputtering time period and a content of silicon atoms. FIG. 18 shows that the coating film has excellent gradient.

EXAMPLE 11

Figure 19:
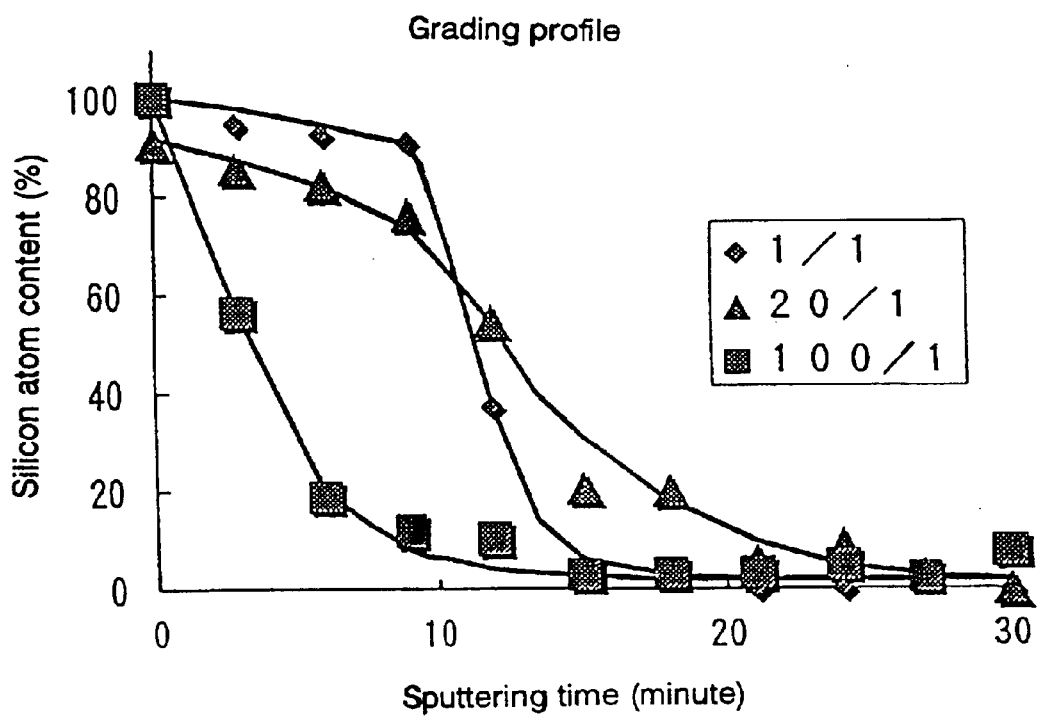
FIG. 19 is a graph showing a relationship between a sputtering time period and the content of silicon atoms in each of three organic-inorganic composite films obtained in Example 11.

In Example 8, the MMA/MPTMS molar ratio was changed to 1/1, 20/1 or 100/1, and a solution of 10 g/l of Component (A) in acetone was prepared. Separately, a mixture of 12 g of TEOS, 2.5 g of concentrated hydrochloric acid and 5 g of ethanol was dropwise added, and the mixture was stirred for 10 hours, to prepare an inorganic component solution. 3 Milliliters of Component (A) solution, 22 ml of acetone and 4 ml of the inorganic component solution were mixed, further, 21 ml of n-hexanol was added, and the mixture was fully stirred. A PET film was dipped in the resultant solution and elevated at a rate of 5.0 cm/minute to form a coating. The thus-formed coating films were measured for gradient in the same manner as in Example 1. FIG. 19 shows a relationship between a sputtering time period and a content of silicon atoms with regard to the above three kinds of MMA/MPTMS (molar ratios). FIG. 19 shows that the gradient of the gradient can be controlled on the basis of a change in the MMA/MPTMS molar ratio.

EXAMPLE 12

Figure 20:
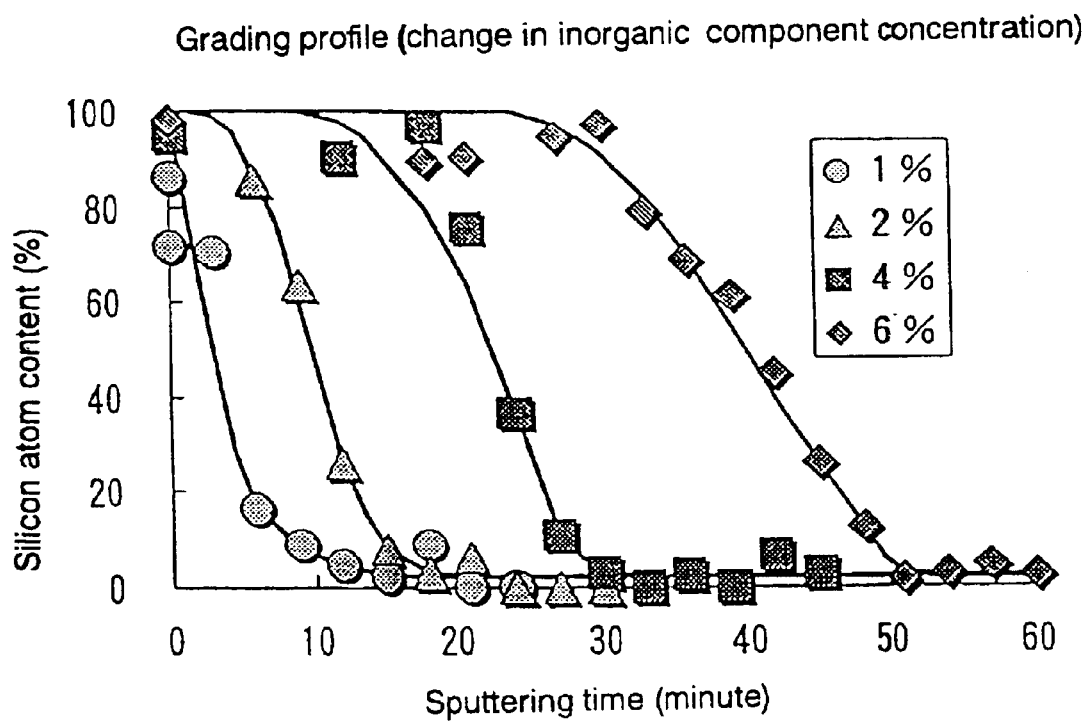
FIG. 20 is a graph showing a relationship between a sputtering time period and the content of silicon atoms in each of four organic-inorganic composite films obtained in Example 12.

In Example 8, the MMA/MPTMS molar ratio was changed to 10/1, and a solution of 10 g/l of Component (A) in acetone was prepared. Separately, a mixture of 12 g of TEOS, 2.5 g of concentrated hydrochloric acid and 5 g of ethanol was dropwise added, and the mixture was stirred for 10 hours, to prepare an inorganic component solution. The inorganic component solution in an arbitrary amount was added to a mixture of 1 ml of Component (A) solution and 4 ml of acetone to prepare coating solutions having inorganic component concentrations of 1, 2, 4 and 6% by weight. These solutions were spin-coated on PET films in the same manner as in Example 8 to give organic-inorganic composite graded films. These graded films were measured for gradient in the same manner as in Example 1. FIG. 20 shows a relationship between a sputtering time period and a content of silicon atoms in each of the above four graded films having the above inorganic component concentrations. FIG. 20 shows that the gradient of the gradient can be controlled on the basis of a change in the inorganic component concentration.

EXAMPLE 13

The graded film coating solution was coated on a 3 cm×3 cm automobile steel sheet coated with a black coating composition (coated with acryl/melamine resins) in the same manner as in Example 4, and the thus-formed coating was dried in an oven at 70° C. for 12 hours. The obtained coated automobile steel sheet was treated with plasma jet (PJ-1, supplied by Kasuga Denki K.K.) for 3 seconds. A solution prepared by diluting 1 g of a titanium oxide photocatalyst coating agent (NDC-200C, supplied by Nippon Soda Co., Ltd.) with 0.08 g of concentrated hydrochloric acid and 9 g of 2-propanol was coated thereon by a spin coating method (1,500 rpm, 20 seconds), and the resultant coating was dried and heat-treated in an oven at 80° C. for 1 hour, to form a titanium oxide coating film having a thickness of 0.2 μm. The above photocatalyst-coated automobile steel sheet was subjected to an accelerated exposure test with a sunshine weatherometer (temperature in the tester 60° C., spray cycle 18 minutes out of 120 minutes) to study a contact angle of water and a change in appearance. When the above coating was measured for a contact angle of water after 20 days, the contact angle was less than 3°, and no change was found in ultra-hydrophilic nature on the surface as compared with a pre-test data. Further, neither interference fringes nor whitening was observed, and the coating exhibited excellent durability.

Table 1 shows a relationship of an exposure time, the contact angle of the graded film and an appearance.

TABLE 1

| | | Exposure time period (hr) | | | | | |
|---|---|---|---|---|---|---|---|
| | | 0 | 60 | 120 | 180 | 240 | 420 |
| Graded film | Contact angle (degree) | <3 | <3 | <3 | <3 | <3 | <3 |
| | Appearance | E | E | E | E | E | E |

E = Excellent

COMPARATIVE EXAMPLE 1

A coating film was formed in the same manner as in Example 1 except that, in the preparation of the polymer solution in Example 1, 3-methacryloxypropyltrimethoxysilane was not used, and that the amount of methyl methacrylate was changed to 12 g. This film was evaluated for a gradient in the same manner as in Example 1.

Figure 7:
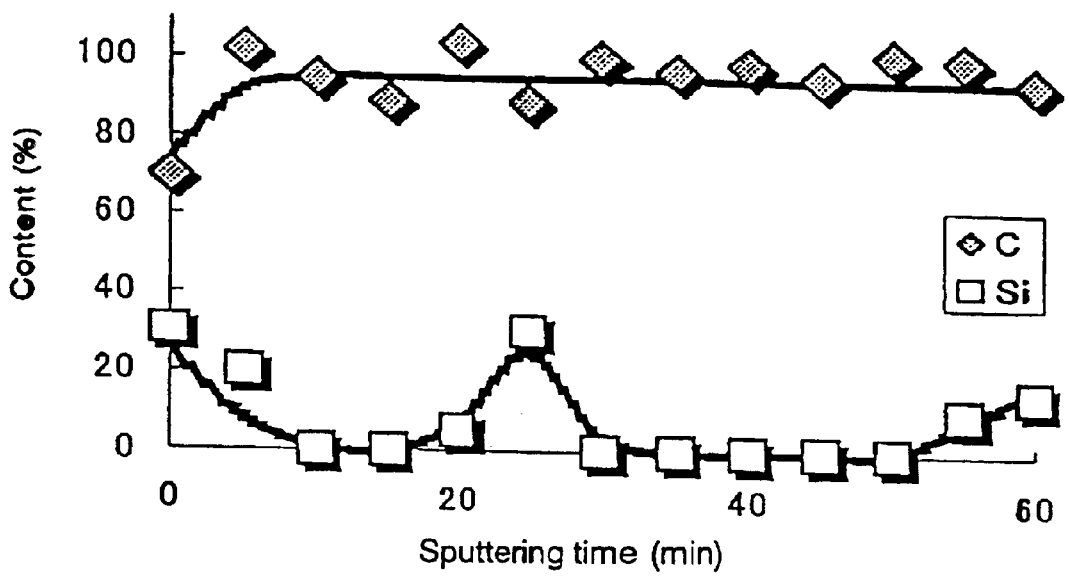
FIG. 7 is a graph showing a relationship between a sputtering time period and contents of carbon atoms and silicon atoms in an organic-inorganic composite film obtained in Comparative Example 1.

FIG. 7 shows, as a graph, a relationship between a sputtering time period and contents of the carbon atoms and the silicon atoms. As shown in FIG. 7, no film having a gradient was obtained.

COMPARATIVE EXAMPLE 2

A coating film was formed in the same manner as in Example 1 except that the polymethyl methacrylate substrate was replaced with a glass substrate. This film was evaluated for a gradient in the same manner as in Example 1.

Figure 8:
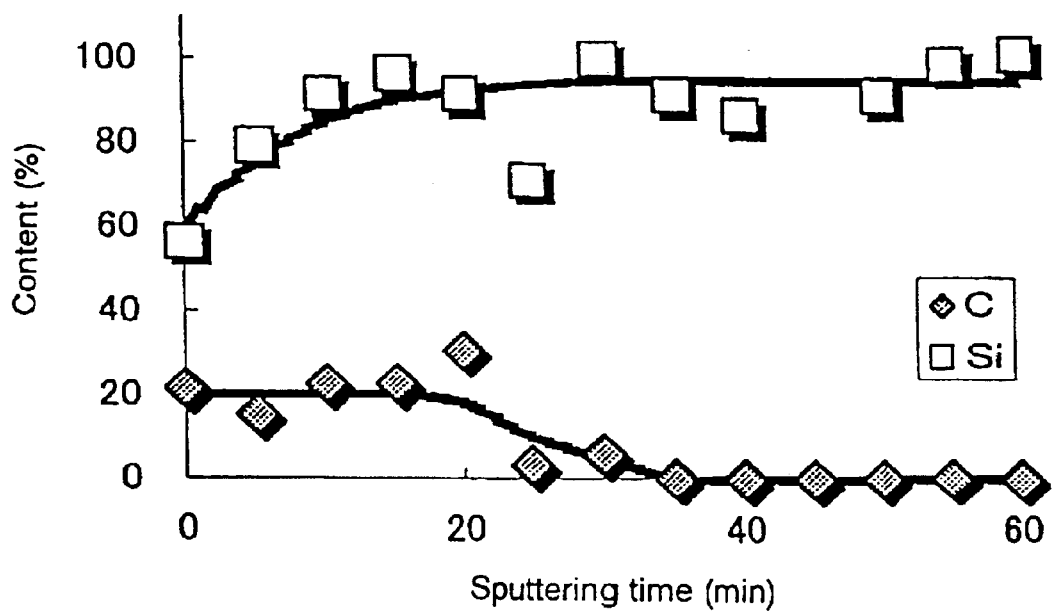
FIG. 8 is a graph showing a relationship between a sputtering time period and contents of carbon atoms and silicon atoms in an organic-inorganic composite film obtained in Comparative Example 2.

FIG. 8 shows, as a graph, a relationship between a sputtering time period and contents of the carbon atoms and the silicon atoms. As shown in FIG. 8, no film having a gradient was obtained.

COMPARATIVE EXAMPLE 3

6.5 Grams of a commercially available acryl silicone resin solution "GS-1020" (supplied by ToaGosei K.K.) was added to 20 g of a toluene/isopropanol mixed solvent (volume ratio 1/1), and the mixture was stirred. The resultant mixture was applied onto a polymethyl methacrylate substrate by a spin coating method (1,500 rpm, 10 seconds), and the formed coating was dried at 70° C. for 12 hours to form a coating film as an intermediate film.

The above film was evaluated for durability in the use thereof as an intermediate film for titanium dioxide.

Figure 9:
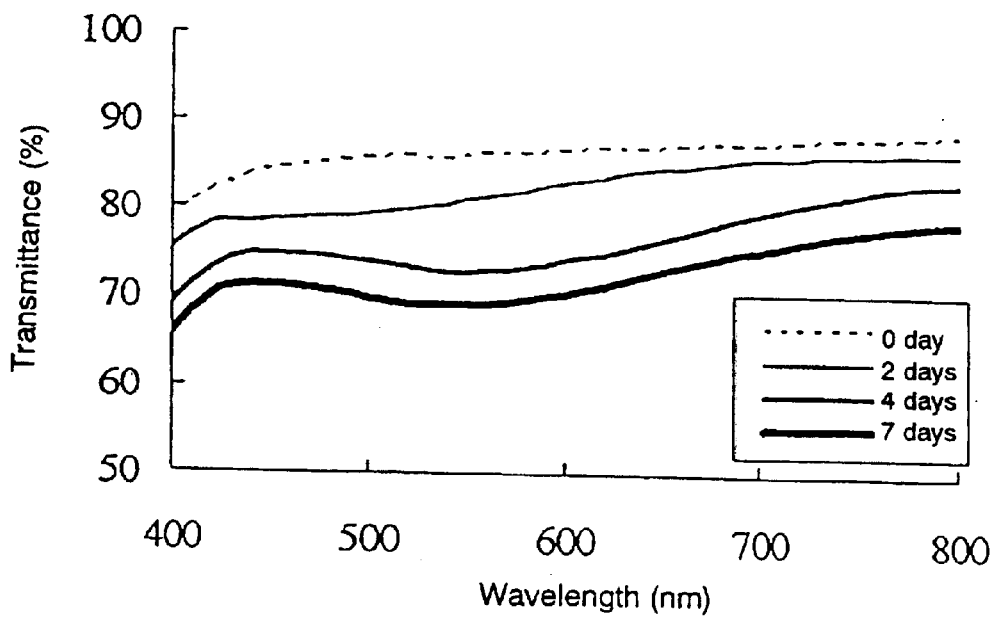
FIG. 9 is a graph showing a change of transmittance spectrum with the passage of time in a visible light region in a coating film obtained in Comparative Example 3.

FIG. 9 shows a change of transmittance spectrum of the above film in a visible light region with the passage of time, and FIG. 13 shows, as a graph, a relationship between the number of days for irradiation with ultraviolet light and a decrease amount of transmittance at a wavelength of 500 nm.

As shown in FIGS. 9 and 13, the above film did not show good durability.

COMPARATIVE EXAMPLE 4

8.1 Grams of a commercially available inorganic adhesive "Ethyl Silicate 40" (supplied by COLCOAT Co., Ltd.) was added to 20 g of a toluene/isopropanol mixed solvent (volume ratio 1/1), and the mixture was stirred. The resultant mixture was applied onto a polymethyl methacrylate substrate by a spin coating method (1,500 rpm, 10 seconds), and the formed coating was dried at 70° C. for 12 hours to form a coating film as an intermediate film.

The above film was evaluated for durability in the use thereof as an intermediate film for titanium dioxide.

Figure 10:
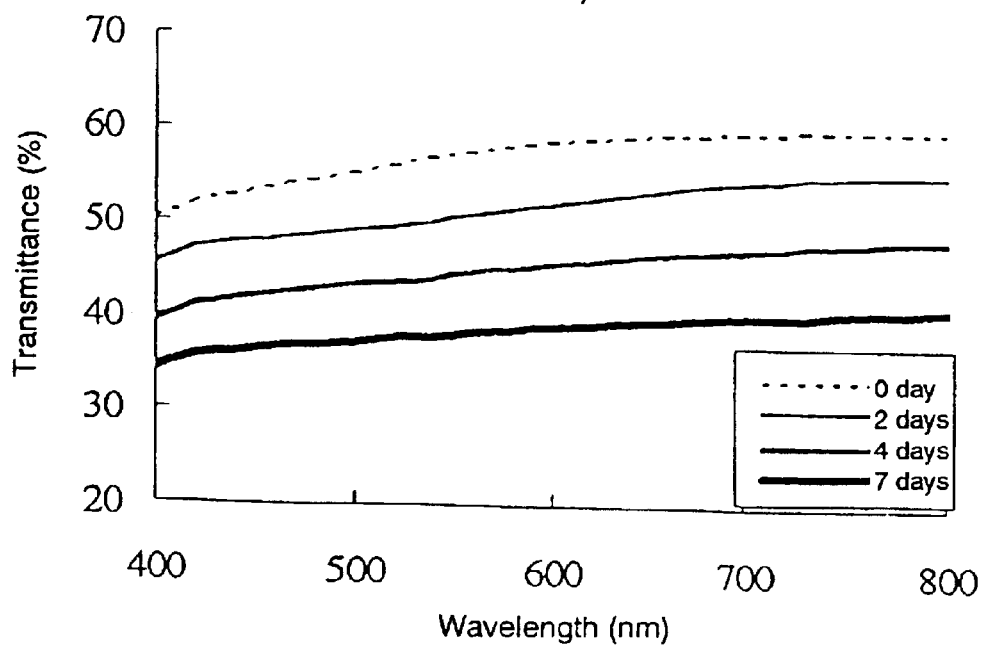
FIG. 10 is a graph showing a change of transmittance spectrum with the passage of time in a visible light region in a coating film obtained in Comparative Example 4.

FIG. 10 shows a change of transmittance spectrum of the above film in a visible light region with the passage of time, and FIG. 13 shows, as a graph, a relationship between the number of days for irradiation with ultraviolet light and a decrease amount of transmittance at a wavelength of 500 nm.

As shown in FIGS. 10 and 13, the above film did not show good durability.

COMPARATIVE EXAMPLE 5

5.0 Grams of a commercially available acryl silicone resin solution "GS-1020" (supplied by ToaGosei K.K.) was added to 10 g of a toluene/isopropanol mixed solvent (volume ratio 1/1), and the mixture was stirred. 1.9 Grams of a commercially available inorganic adhesive "Ethyl Silicate 40" (supplied by COLCOAT Co., Ltd.) was gently dropwise added to the above mixture, and the resultant mixture was stirred. Further, 10 g of a toluene/isopropanol mixed solvent (volume ratio 1/1) was added, and the mixture was stirred to obtain a coating solution. This coating solution was applied onto a polymethyl methacrylate substrate by a spin coating method (1,500 rpm, 10 seconds), and the formed coating was dried at 70° C. for 12 hours to form a coating film as an intermediate film.

The above film was evaluated for durability in the use thereof as an intermediate film for titanium dioxide.

Figure 11:
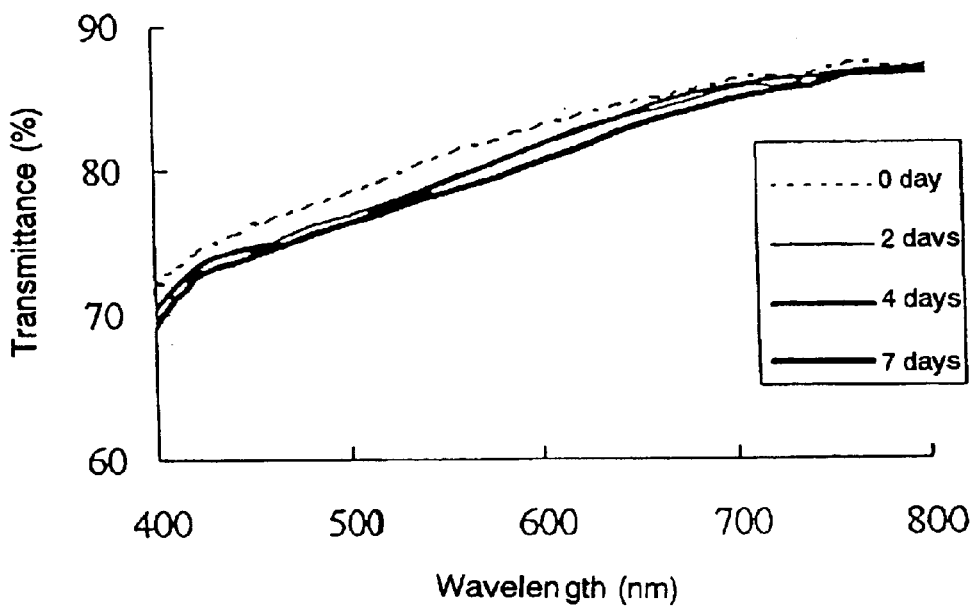
FIG. 11 is a graph showing a change of transmittance spectrum with the passage of time in a visible light region in a coating film obtained in Comparative Example 5.

FIG. 11 shows a change of transmittance spectrum of the above film in a visible light region with the passage of time, and FIG. 13 shows, as a graph, a relationship between the number of days for irradiation with ultraviolet light and a decrease amount of transmittance at a wavelength of 500 nm.

As shown in FIGS. 11 and 13, the above film showed good durability to some extent, but it was found that the transmittance decreased.

COMPARATIVE EXAMPLE 6

In Example 8, no MPTMS was used, and an organic-inorganic composite film coating solution in which Component (A) and Component (B) were not chemically bonded to each other was synthesized. That is, 12 g of methyl methacrylate (supplied by Wako-Purechemical Ind. Co., Ltd.) and 0.2 g of 2,2'-azobisisobutyronitrile (supplied by Wako-Purechemical Ind. Co., Ltd.) were placed in a 50 ml container made of glass, and the container was hermetically closed with a lid. The container was placed in a water bath, and the methyl methacrylate was allowed to undergo radical polymerization at 75° C. for 2.5 hours with stirring with a magnetic stirrer. After completion of the reaction, the polymerizate was cooled to room temperature, and 0.2 g of the above polymerizate was dissolved in 20 ml of acetone, to obtain a polymer solution containing no MPTMS.

Separately, an inorganic component solution as Component (B) was obtained using tetraethoxysilane in the same manner as in Example 8.

Figure 21:
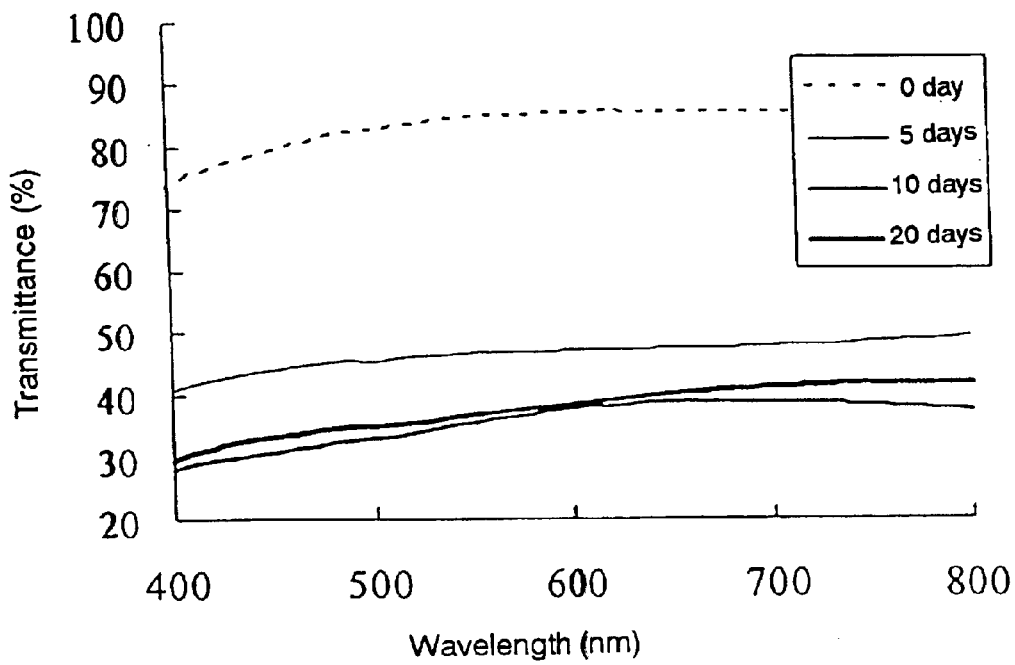
FIG. 21 is a graph showing a change of visible light transmittance in an exposure test of a film having an organic-inorganic composite film as an intermediate film and a coating film made of titanium dioxide, obtained in Comparative Example 6, with a sunshine weatherometer.

Thereafter, a coating solution was prepared and coated on a PET film, and further, a photocatalyst titanium oxide coating agent was applied, in the same manner as in Example 8, to obtain a film. FIG. 21 shows a result of an accelerated exposure test of the film with a sunshine weatherometer. The light transmittance at 500 nm already decreased from 83% before the test to 45% after 5 days, and whitening is caused on an appearance, so that it was found that the film was deteriorated.

COMPARATIVE EXAMPLE 7

Figure 22:
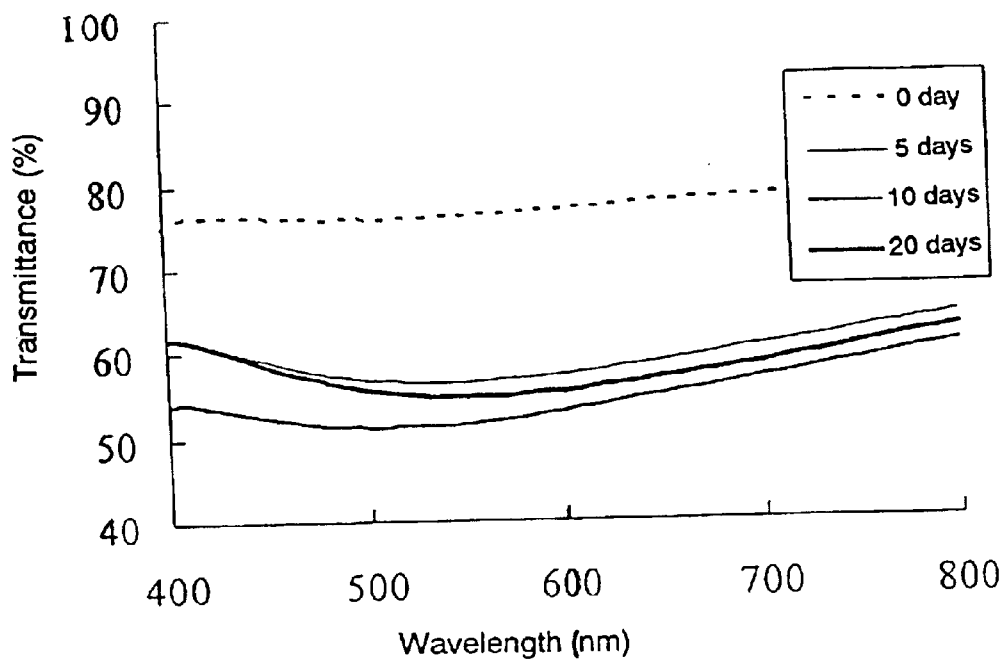
FIG. 22 is a graph showing a change of visible light transmittance in an exposure test of a film having an intermediate film made of an undercoating agent and a coating film made of titanium dioxide, obtained in Comparative Example 7, with a sunshine weatherometer.

A film coated with photocatalyst titanium oxide was obtained in the same manner as in Example 1 except that the organic-inorganic composite film coating solution was replaced with a commercially available undercoating agent (BISTRATER NDC-100A, supplied by Nippon Soda Co., Ltd.) for a photocatalyst titanium oxide coating agent. The above film was subjected to an accelerated exposure test with a sunshine weatherometer. FIG. 22 shows a change in visible light transmittance on the basis of exposure time periods in the sunshine weatherometer. The light transmittance at 500 nm already decreased from 76% before the test to 57% after 5 days, and whitening is caused on an appearance, so that it was found that the film was deteriorated.

COMPARATIVE EXAMPLE 8

Figure 23:
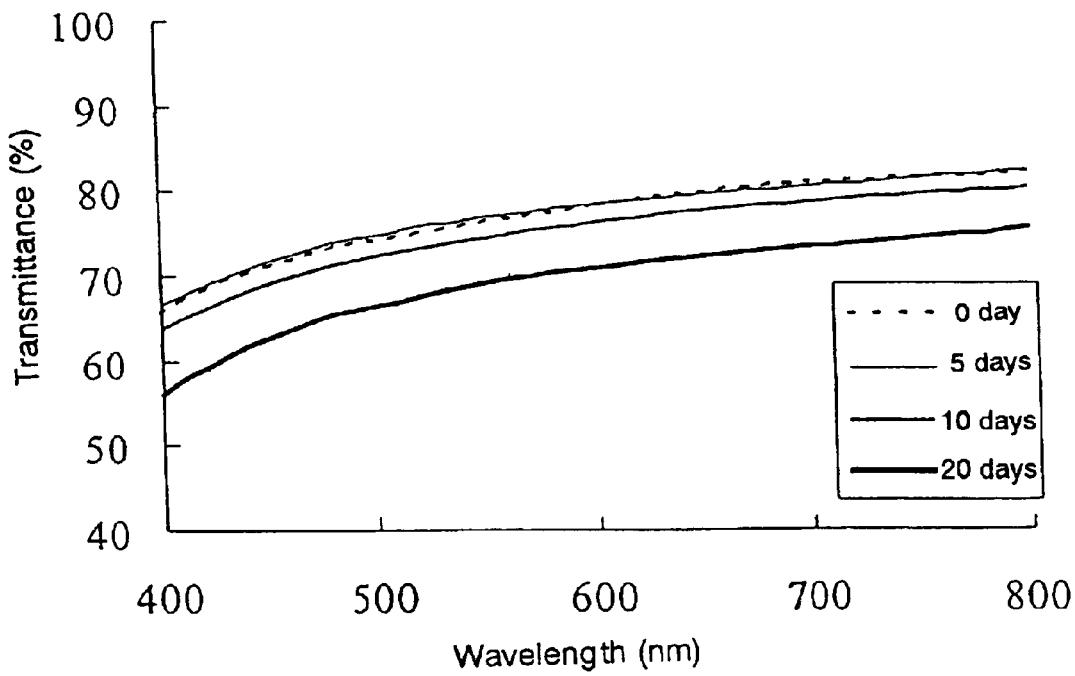
FIG. 23 is a graph showing a change of visible light transmittance in an exposure test of a film having an intermediate film made of an undercoating agent and a coating film made of titanium dioxide, obtained in Comparative Example 8, with a sunshine weatherometer.

A film coated with photocatalyst titanium oxide was obtained in the same manner as in Example 8 except that the organic-inorganic composite film coating solution was replaced with a commercially available undercoating agent for a photocatalyst titanium oxide coating agent. The above film was subjected to an accelerated exposure test with a sunshine weatherometer. FIG. 23 shows a change in visible light transmittance on the basis of exposure time periods in the sunshine weatherometer. The light transmittance at 500 nm decreased from 74% before the test to 66% after 20 days, and whitening is caused on an appearance, so that it was found that the film was deteriorated.

EXAMPLE 14

[Preparation of Component (A)]

21.8 Grams of methyl methacrylate and 5.41 g of 3-methacryloxypropyltrimethoxysilane were mixed and fully stirred, and 0.4 g of 2,2'-azobisisobutyronitrile was added. The mixture was allowed to react at 70° C. for 2.5 hours with stirring. After the reaction mixture was allowed to cool, 4 g of the obtained polymerizate was dissolved in 2 liters of methyl ethyl ketone to obtain a polymer solution as Component (A).

[Preparation of Component (B)]

40 Grams of concentrated nitric acid, 200 g of ethanol and 460 g of water were gently dropwise added to a mixture solution of 480 g of tetraethoxysilane and 400 g of ethanol with stirring, and the mixture was continuously stirred at room temperature for 5 hours to obtain an inorganic component solution as Component (B).

[Preparation of Graded Film Coating Solution]

1.5 Liters of ethyl cellosolve was added to the polymer solution as Component (A), and the mixture was stirred. To this mixture was added 500 g of the inorganic component solution as Component (B), and the mixture was fully stirred to obtain a graded film coating solution.

[Bar Coat of Graded Film]

Figure 24:
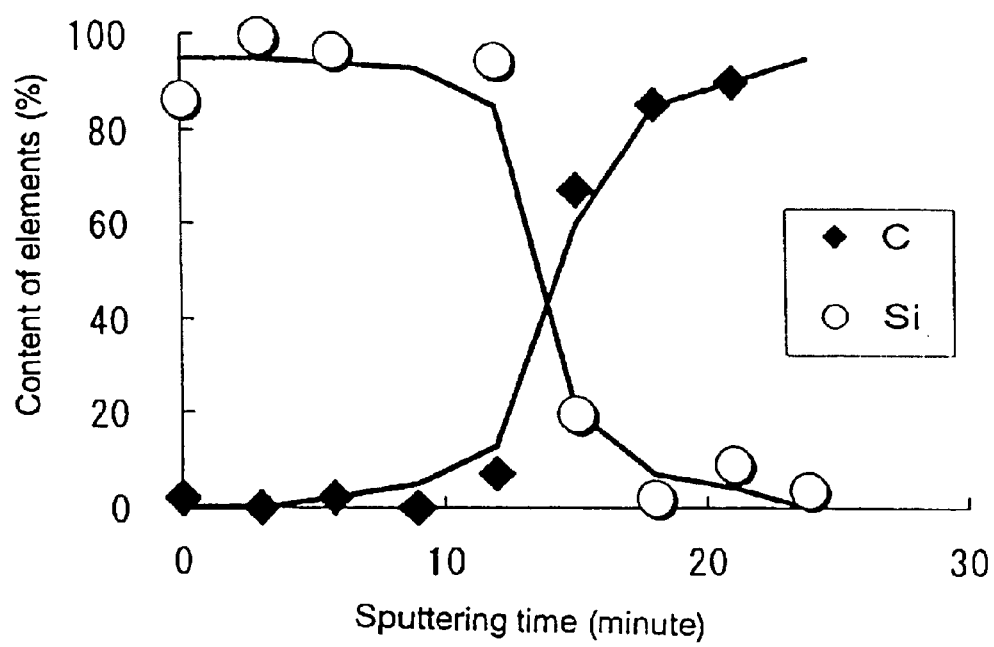
FIG. 24 is a graph showing a relationship between a sputtering time period and contents of carbon atoms and silicon atoms in an organic-inorganic composite film obtained in Example 14.

The coating solution was coated on a PET film "Lumirror T-60" (thickness 50 µm, width 330 mm) supplied by Toray Ind., Inc. with a "Multi-Coater M200" supplied by Hirano Tecseed Co., Ltd. by a Kiss mayer Bar method (line diameter 0.1 mm, line velocity 10 m/minute, drying temperature 120° C.) to form an organic-inorganic composite film having a thickness of 0.1 µm. This film was evaluated for a gradient in the same manner as in Example 1. FIG. 24 shows a relationship between a sputtering time period and each of contents of carbon atoms and silicon atoms. FIG. 24 shows that the film has excellent gradient.

EXAMPLE 15

2 Grams of polymerizate obtained in the same manner as in Example 14 was dissolved in 1 liter of methyl isobutyl ketone to obtain a polymer solution as Component (A). To this polymer solution was added 0.8 liter of 1-butanol, and the mixture was stirred. Then, 200 g of the inorganic component solution as component (B) in Example 14 was added, and the mixture was fully stirred to obtain a graded film coating solution.

Figure 25:
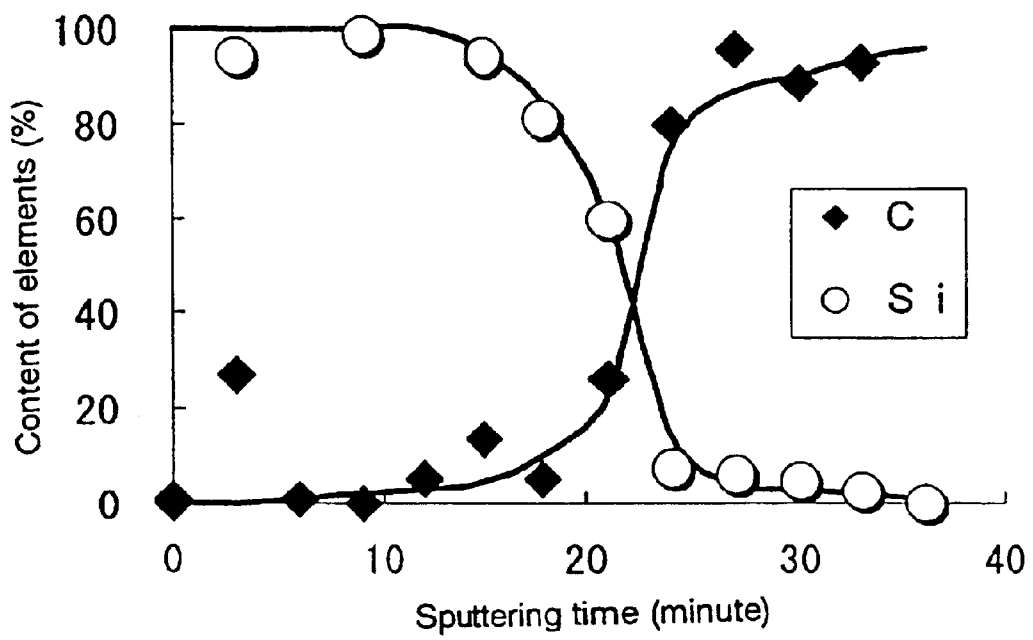
FIG. 25 is a graph showing a relationship between a sputtering time period and contents of carbon atoms and silicon atoms in an organic-inorganic composite film obtained in Example 15.

The above coating solution was coated on an acryl plate "Acrylite" (thickness 2 mm, 300 mm×300 mm) supplied by Mitsubishi Rayon K.K. with a spray gun "W-88 series" supplied by Anest Iwata K.K. at an air pressure of 0.2 MPa, at a spray distance of 15 cm, at a spray operation rate of 15 m/minute, and the thus-formed coating was dried at 80° C. to form an organic-inorganic composite film having a thickness of 0.15 µm. This film was evaluated for a gradient in the same manner as in Example 1. FIG. 25 shows a relationship between a sputtering time period and each of contents of carbon atoms and silicon atoms. FIG. 25 shows that the film has excellent gradient.

EXAMPLE 16

1 Gram of a polymerizate obtained in the same manner as in Example 14 and 56 g of tetraisocyanatosilane "Orgatics-Si400" supplied by Matsumoto Pharm Ind. were dissolved in 1 liter of toluene to obtain a graded film coating solution.

Figure 26:
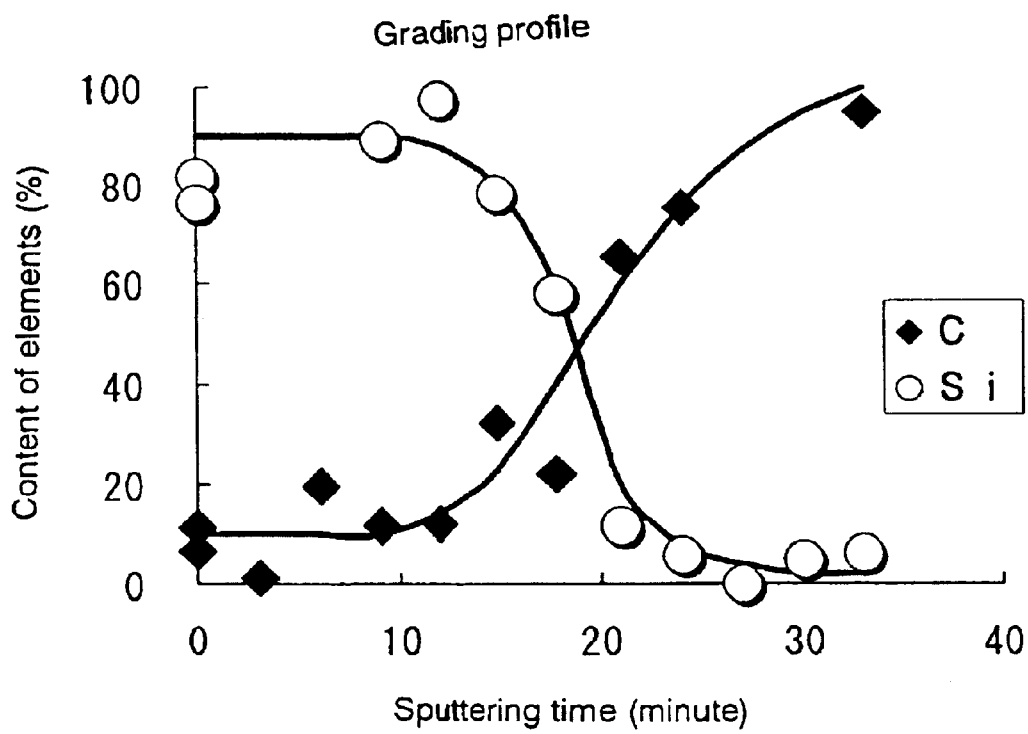
FIG. 26 is a graph showing a relationship between a sputtering time period and contents of carbon atoms and silicon atoms in an organic-inorganic composite film obtained in Example 16.

The above coating solution was coated on an acryl plate "Acrylite" (thickness 2 mm, 300 mm×300 mm) supplied by Mitsubishi Rayon K.K. with a spray gun "W-88 series" supplied by Anest Iwata K.K. at an air pressure of 0.2 MPa, at a spray distance of 15 cm at a spray operation rate of 15 m/minute, and the thus-formed coating was dried at 25° C. to form an organic-inorganic composite film having a thickness of 0.12 µm. This film was evaluated for a gradient in the same manner as in Example 1. FIG. 26 shows a relationship between a sputtering time period and each of contents of carbon atoms and silicon atoms. FIG. 26 shows that the film has excellent gradient.

EXAMPLE 17

1 Gram of a polymerizate obtained in the same manner as in Example 14 and 0.29 liter of polysilazane "L110 (20 wt % xylene solution) were dissolved in 0.71 liter of xylene to obtain a graded film coating solution.

Figure 27:
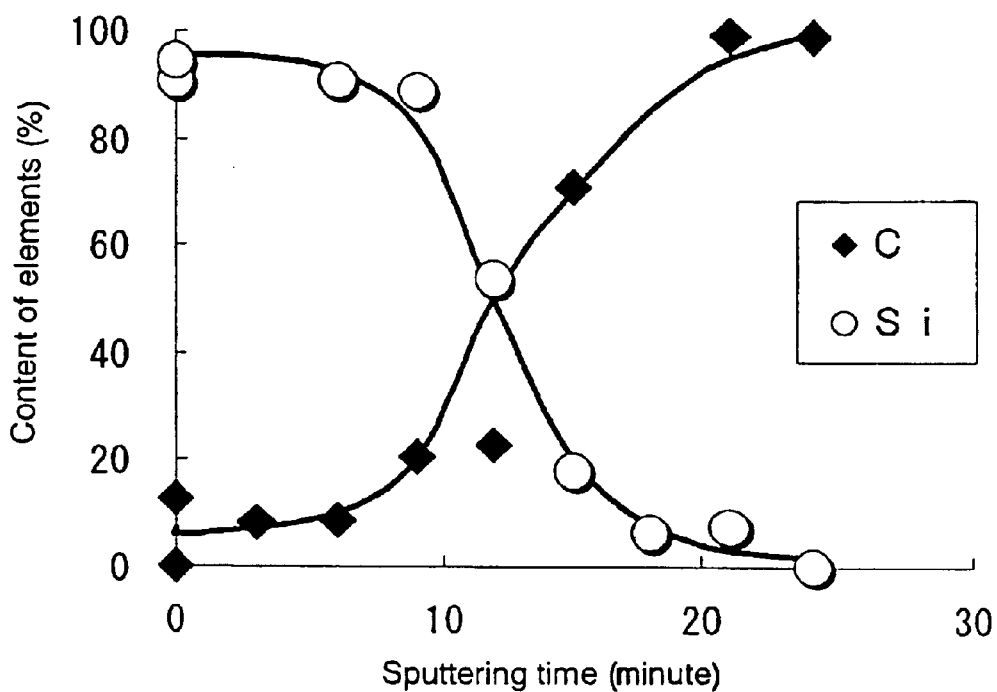
FIG. 27 is a graph showing a relationship between a sputtering time period and contents of carbon atoms and silicon atoms in an organic-inorganic composite film obtained in Example 17.

The above coating solution was coated on a PET film "Toray Lumirror T-60" with a spin coater (1,500 rpm, 15 seconds), and the formed coating was dried at 80° C. for 1 hour and dried 95° C. and 80% RH for 3 hours to form an organic-inorganic composite film having a thickness of 0.12 $\mu$m. This film was evaluated for a gradient in the same manner as in Example 1. FIG. 27 shows a relationship between a sputtering time period and each of contents of carbon atoms and silicon atoms. FIG. 27 shows that the film has excellent gradient.

EXAMPLE 18

[Preparation of Component (A)]

11.86 Grams of styrene (Wako-Purechemical Ind. Co., Ltd.) and 1.42 g of 3-methacryloxypropyltrimethoxysilane were placed in a glass container having a volume of 50 ml, 0.2 g of 2,2'-azobisisobutyronitrile was added, and the mixture was stirred to completely dissolve them. Then, in a hot water bath adjusted to 70° C., the container was heated for 5 hours to polymerize the styrene, and 0.2 mg of the obtained polystyrene copolymer was placed in other glass container and dissolved in 200 ml of a tetrahydrofuran solvent, to obtain a polymer solution as Component (A).

[Preparation of Graded Film]

40 Milliliters of tetrahydrofuran and 40 ml of ethanol were placed in a glass container having a volume of 100 ml, and 10 ml of each of the above polymer solution and the inorganic component solution obtained in Example 1 were added to obtain a graded film coating solution.

[Spin Coating for Graded Film]

The above coating solution was coated on a PET substrate by a spin coating method according to the method in Example 1 and dried to form an organic-inorganic composite film.

Figure 28:
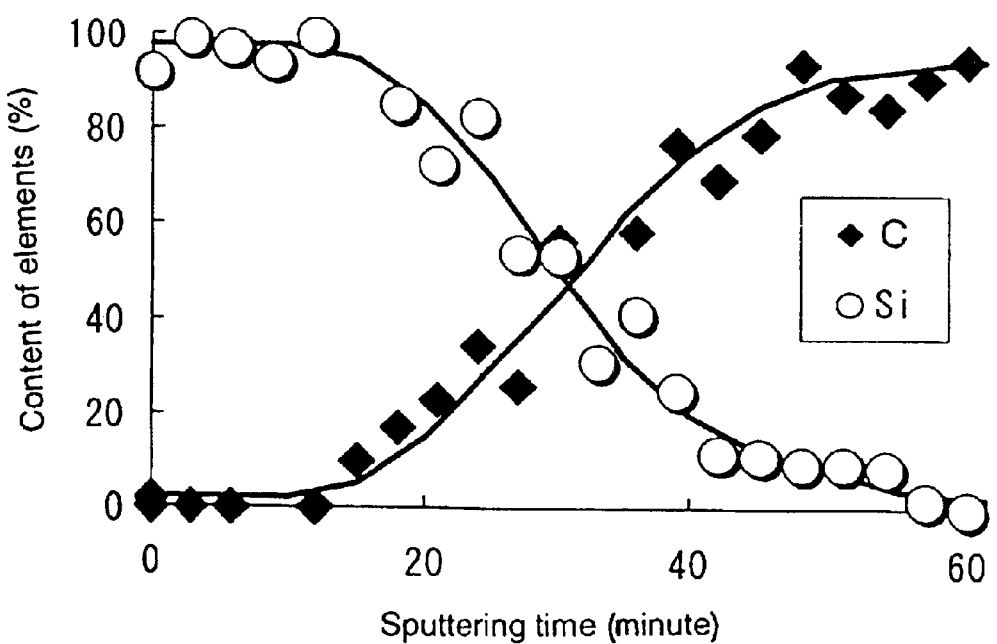
FIG. 28 is a graph showing a relationship between a sputtering time period and contents of carbon atoms and silicon atoms in an organic-inorganic composite film obtained in Example 18.

This film was evaluated for a gradient in the same manner as in Example 1. FIG. 28 shows a relationship between a sputtering time period and each of contents of carbon atoms and silicon atoms. FIG. 28 shows that the film has excellent gradient.

EXAMPLE 19

Electrically Conductive Film (1) Formation of Organic-inorganic Composite Film 10.92 Grams of methyl methacrylate and 2.71 g of 3-methacryloxypropyltrimethoxysilane were mixed and the mixture was fully stirred. Then, 0.2 g of 2,2'-azobisisobutyronitrile was added to the mixture, and the mixture was allowed to react with stirring at 75° C. for 3 hours. 1.0 Gram of the obtained polymerizate was dissolved in 100 ml of acetone to obtain a solution of an organic polymer compound (to be referred to as "polymer solution" hereinafter) as Component (A).

Separately, a solution of 3.1 g of concentrated hydrochloric acid and 5 ml of ethanol was gradually dropwise added in a solution of 12 g of tetraethoxysilane in 10 ml of ethanol. The mixture was stirred at room temperature for 5 hours to obtain an inorganic component solution as Component (B).

10 Milliliters of the polymer solution was mixed with 40 ml of acetone, and the mixture was homogeneously stirred. Then, 40 ml of ethanol was added, further, 10 ml of the inorganic component was added, and the mixture was stirred until the mixture came to be uniform.

The above-obtained coating solution was applied onto a 0.188 mm thick polyethylene terephthalate film by a spin coating method (1,500 rpm, 10 seconds), and the thus-formed coating was dried at 40° C. for 12 hours to form an organic-inorganic composite film on the substrate.

Figure 29:
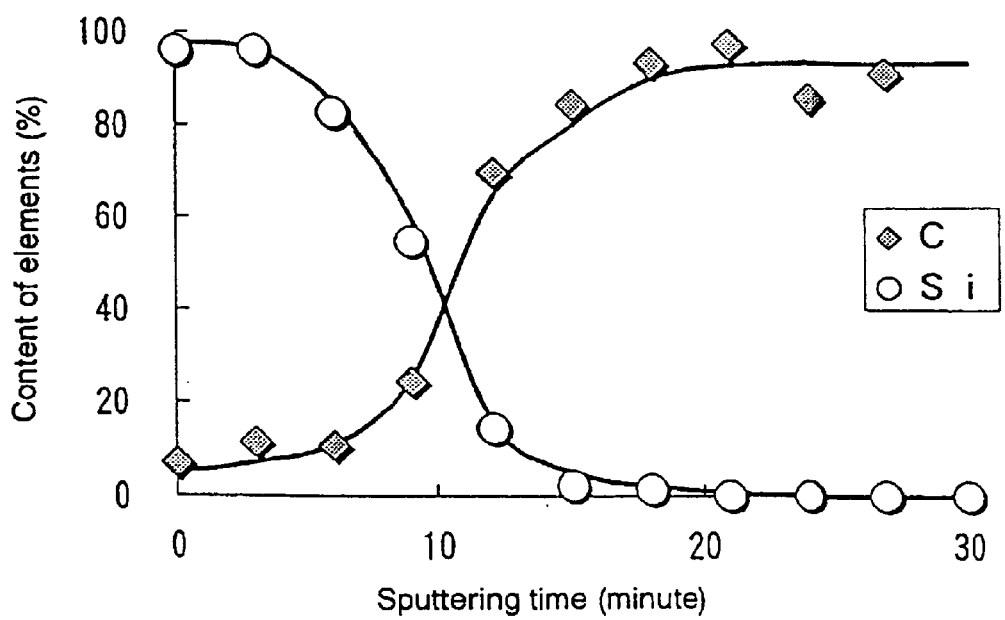
FIG. 29 is a graph showing a relationship between a sputtering time period and contents of carbon atoms and silicon atoms in an organic-inorganic composite film obtained in Example 19.

The above film was measured for a depth profile with an XPS (supplied by ULVAC-PHI Incorporated) to determine a ratio of contents of carbon and silicon for studying its gradient. FIG. 29 shows, as a graph, a relationship between a sputtering time period and contents of the carbon atoms and the silicon atoms. FIG. 29 shows that the organic-inorganic composite film has excellent gradient.

(2) Preparation of Electrically Conductive Film

A transparent electrically conductive film having a thickness of 40 nm was formed on the film obtained in (1) in an atmosphere of argon and oxygen mixed gases (volume ratio 99:1) by means of a DC magnetron sputtering apparatus (HS-720, supplied by Shimadzu Corporation) using an oxide target made of 90% by weight of indium oxide and 10% by weight of stannic oxide, whereby the electrically conductive film was prepared.

The obtained electrically conductive film was studied for a sheet resistance value, light transmittance, crosscut peel test data and heat resistance test data as its properties by the following methods. Table 2 summarizes the results.

(a) Sheet Resistance Value

The transparent electrically conductive film formed on one surface was measured for a sheet resistance value ($\Omega/\square$) with a resistivity meter.

(b) Light Transmittance

The film was measured for a light transmittance (%) at 550 nm with a spectrophotometer (UV-2100, supplied by Shimadzu Corporation).

(c) Crosscut Peel Test

A crosscut tape method was carried out according to JIS K5400. The coating film surface of a test piece was crosscut to form 100 squares having 1 mm×1 mm size each with a rotary cutter, and a Cellotape (trade name) supplied by Nichiban was attached thereto by pressing it and then peeled at a rate of 800 mm/minute at an angle of 180 degrees. Then number of square(s) of the 100 squares which were peeled off or not peeled off were counted for evaluation of adhesion.

(d) Heat Resistance

A test piece was maintained in an oven at 70° C. for 2 hours, temperature-decreased to −30° C. over 2 hours, then maintained at −30° C. for 2 hours and then temperature-increased again up to 70° C. over 2 hours, and this cycle was repeated five times to carry out a heat cycle test. For evaluation, the test piece was measured for a sheet resistance value and subjected to a crosscut peel test to study adhesion of a coating (presence or absence of squares out of 100 squares).

EXAMPLE 20

An electrically conductive film was formed on a polycarbonate film coated with the organic-inorganic composite film obtained in Example 7, in the same manner as in Example 19.

Table 2 shows the properties of the above electrically conductive film.

EXAMPLE 21

A solution containing 3.1 g of concentrated hydrochloric acid and 5 ml of ethanol was gradually dropwise added to a solution of 8.33 g of tetraethoxysilane and 1.36 g of methyltrimethoxysilane in 10 ml of ethanol with stirring. This mixture solution was stirred at room temperature for 5 hours to obtain an inorganic component solution.

An electrically conductive film was formed in the same manner as in Example 19 except that, after 10 ml of the polymer solution (A) in Example 19 was mixed with 40 ml of acetone and the mixture was homogeneously stirred, 40 ml of ethanol was then added, and further that 10 ml of the inorganic component solution was added and that the mixture was stirred until it came to be uniform.

Figure 30:
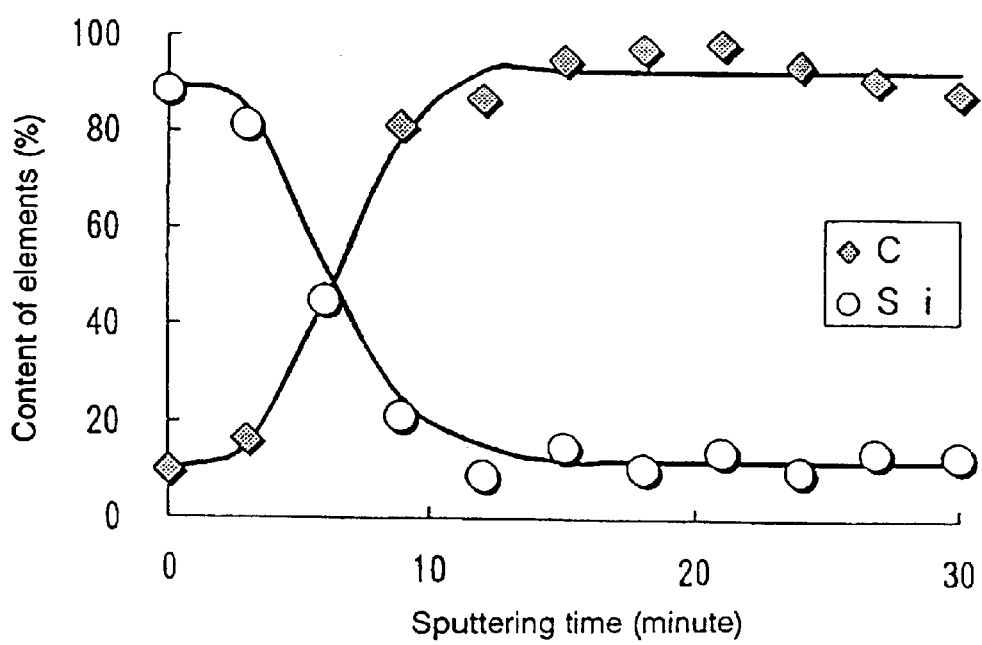
FIG. 30 is a graph showing a relationship between a sputtering time period and contents of carbon atoms and silicon atoms in an organic-inorganic composite film obtained in Example 21.

The organic-inorganic composite film before the coating of an ITO film was measured for a depth profile with an XPS (PHI-5600, supplied by ULVAC-PHI Incorporated) to determine a ratio of contents of carbon and silicon for studying its gradient. FIG. 30 shows the results.

Table 2 shows properties of the above electrically conductive film.

COMPARATIVE EXAMPLE 9

An electrically conductive film was formed in the same manner as in Example 19 except that 1.0 g of a polymerizate obtained by adding 0.2 g of 2,2'-azobisisobutyronitrile to 12 g of methyl methacrylate and allowing the methyl methacrylate to react at 75° C. for 3 hours with stirring was dissolved in 100 ml of acetone to obtain a solution of a polymethyl methacrylate compound.

Figure 31:
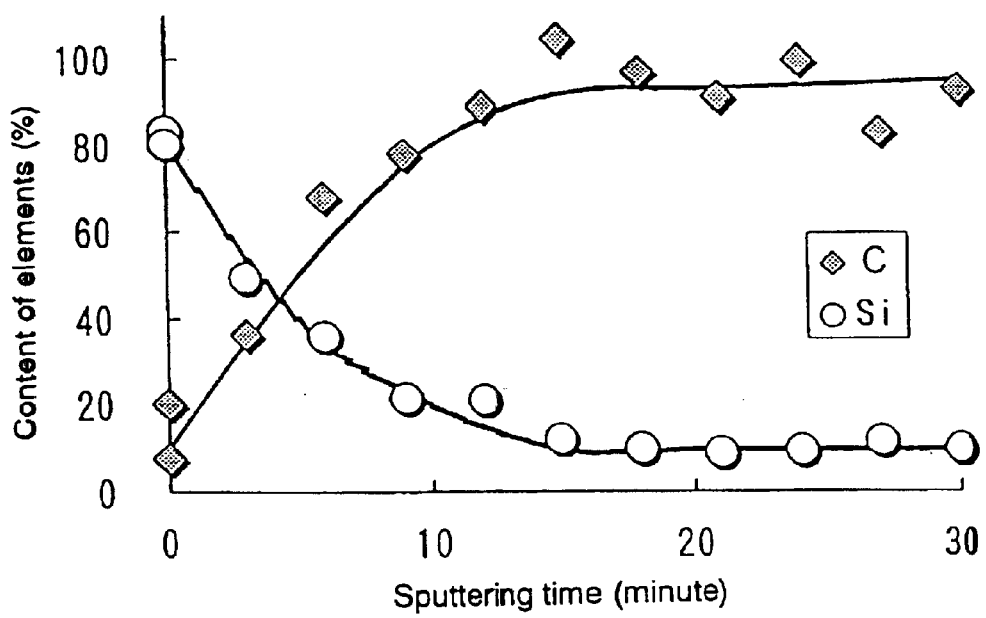
FIG. 31 is a graph showing a relationship between a sputtering time period and contents of carbon atoms and silicon atoms in an organic-inorganic composite film obtained in Comparative Example 9.

The organic-inorganic composite film before the coating of an ITO film was measured for a depth profile with an XPS (supplied by ULVAC-PHI Incorporated) to determine a ratio of contents of carbon and silicon for studying its gradient. FIG. 31 shows the results.

Table 2 shows properties of the above electrically conductive film.

COMPARATIVE EXAMPLE 10

An electrically conductive film was formed in the same manner as in Example 19 except that 10 ml of the polymethyl methacrylate compound solution prepared in Comparative Example 9 was diluted with 20 ml of acetone and 20 ml of ethanol to obtain a coating solution.

Table 2 shows properties of the above electrically conductive film.

TABLE 2

| | Properties of electrically conductive film | | | | |
| --- | --- | --- | --- | --- | --- |
| | Light | | | Heat resistance | |
| | Sheet resistance ($\Omega/\square$) | transmittance (%) | Crosscut peel test | Sheet resistance ($\Omega/\square$) | Crosscut peel test |
| Ex. 19 | 300 | 85 | 94/100 | 320 | 92/100 |
| Ex. 20 | 280 | 83 | 100/100 | 280 | 100/100 |
| Ex. 21 | 280 | 85 | 95/100 | 280 | 93/100 |
| CEx. 9 | 310 | 84 | 50/100 | 1,300 | 40/100 |
| CEx. 10 | 300 | 85 | 100/100 | 1,850 | 35/100 |

Ex. = Example, CEx. = comparative Example

As shown in Table 2, the electrically conductive films in Examples using the graded films of the present invention maintain electric conductivity and adhesion which almost do not change even after the heat resistance test. However, the counterparts in Comparative Examples show great decreases in electric conductivity and adhesion after the heat resistance.

EXAMPLE 22

Hard Coating Film

A film coated with an organic-inorganic composite graded film was obtained in the same manner as in Example 8 except that the substrate film was replaced with a polycarbonate film. A silicon hard coating agent (Sol Gard NP-730) supplied by Nippon Dacto Shamrock was coated thereon with a bar coater so as to form a dry film having a thickness of 4 µm, and then, the thus-formed coating was cured at 80° C. for 2 hours to give a substrate coated with a desired hard coating film. When the films before the formation of the hard coating were measured for a pencil hardness, the polycarbonate film alone showed F, and the film coated with the composite graded film showed H.

The substrate coated with the above hard coating film was tested as follows. Table 3 summarizes the results.

(1) Adhesion

A crosscut tape method was carried out according to JIS K5400. The coating film surface of a test piece was crosscut to form 100 squares having 1 mm×1 mm size each with a rotary cutter, and a Cellotape (trade name) supplied by Nichiban was attached thereto by pressing it and then peeled at a rate of 300 mm/minute at an angle of 180 degrees. The number of square(s) of the 100 squares which were peeled off or not peeled off were counted for evaluation of adhesion.

(2) Film Hardness

A coating film was subjected to a pencil hardness test with a pencil scratch tester supplied by Yoshimitsu Seiki K.K. according to JIS K5400, and the coating film was evaluated for a film hardness on the basis of whether or not the coating film had scratches.

(3) Wearing Resistance

A coating film was subjected to a wearing resistance test (test conditions: The number of times of wearing 200 times, a load 500 g, a wearing wheel CS-10F) with a taper-method wearing testing machine supplied by Yoshimitsu Seiki K.K. The coating film was evaluated for a wear resistance on the basis of a fogging degree (haze value: ΔH %) after the test.

(4) Heat Resistance

A test piece was maintained in an oven at 70° C. for 2 hours, temperature-decreased to −30° C. over 2 hours, then maintained at −30° C. for 2 hours and then temperature-increased again up to 70° C. over 2 hours, and this cycle was repeated five times to carry out a heat cycle test. For evaluation, the test piece was subjected to a crosscut tape test to study adhesion of a coating (presence or absence of squares out of 100 squares).

EXAMPLES 23 AND 24

Figure 32:
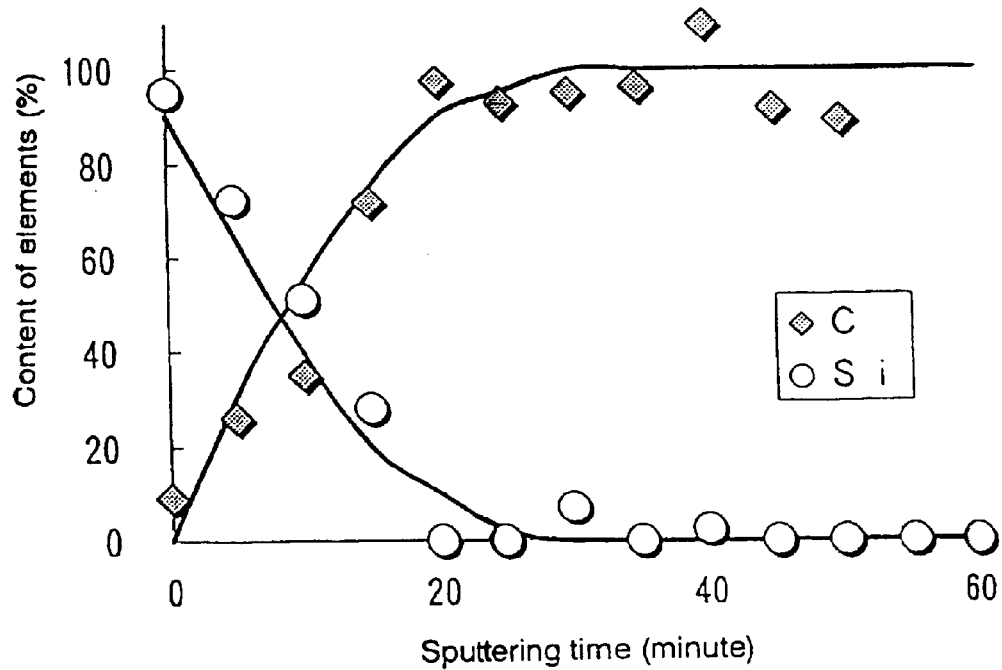
FIG. 32 is a graph showing a relationship between a sputtering time period and contents of carbon atoms and silicon atoms in an organic-inorganic composite film obtained in Example 24.

Substrates coated with a hard coating film were obtained in the same manner as in Example 22 except that the substrate was changed from the 0.4 mm polycarbonate film to a film prepared by coating the graded film on a 0.188 mm thick polyethylene terephthalate film in Example 19 (Example 23) and to a 0.2 mm acryl film (Example 24). Table 3 summarizes evaluation results of these substrates coated with the hard coating film. The film in Example 24 before the formation of the hard coating film was measured for a depth profile with an XPS (PHI-5600, supplied by ULVAC-PHI Incorporated) to determine a ratio of contents of carbon and silicon for studying its gradient. FIG. 32 shows the results.

The polyethylene terephthalate film and the polyethylene terephthalate film coated with the composite graded film had pencil hardnesses of 3H and 4H, respectively, and the acryl film and the acryl film coated with the composite graded film had pencil hardnesses of 4H and 5H, respectively.

EXAMPLE 25

Figure 33:
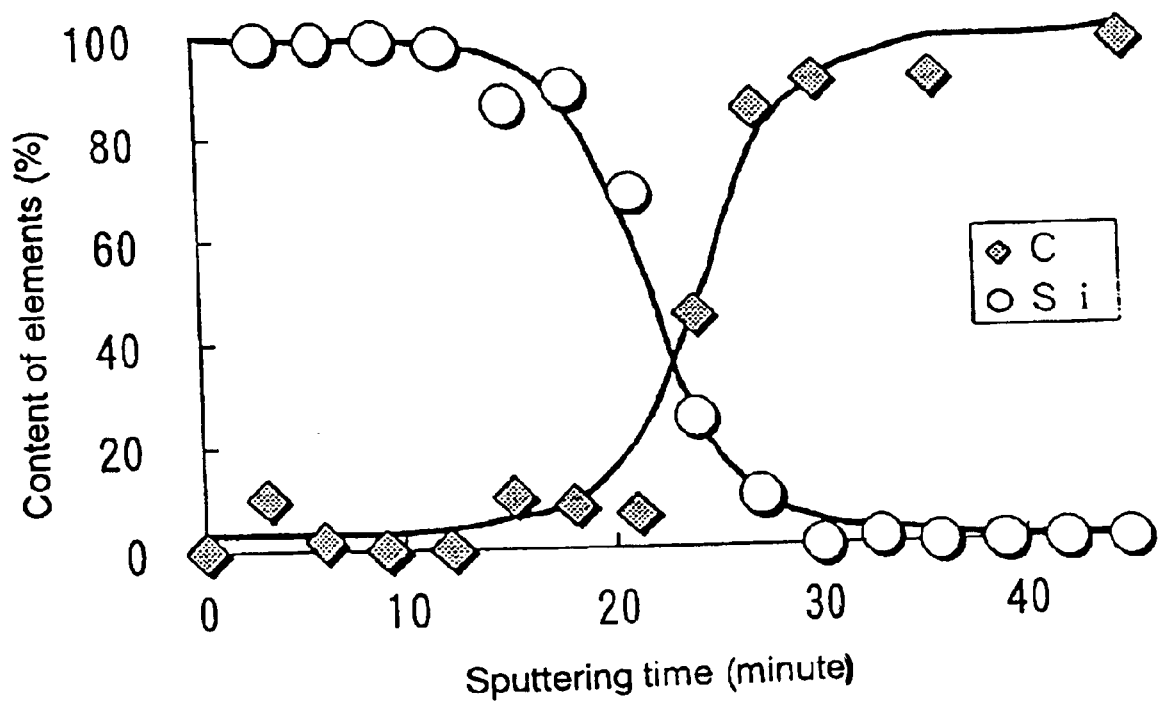
FIG. 33 is a graph showing a relationship between a sputtering time period and contents of carbon atoms and silicon atoms in an organic-inorganic composite film obtained in Example 25.

A substrate coated with a hard coating film was obtained in the same manner as in Example 8 except that, after 10 ml of the polymer solution as Component (A) in Example 8 was mixed with 40 ml of acetone and the mixture was homogeneously stirred, 30 ml of ethanol was added, further that 20 ml of the inorganic component solution as Component (B) in Example 8 was added, that the mixture was stirred until it came to be uniform and that the film substrate was replaced with a polycarbonate film. Table 3 summarizes evaluation results of the substrate coated with the hard coating film. The film before the formation of the hard coating film was measured for a depth profile with an XPS (PHI-5600, supplied by ULVAC-PHI Incorporated) to determine a ratio of contents of carbon and silicon for studying its gradient. FIG. 33 shows the results.

COMPARATIVE EXAMPLE 11

A substrate coated with a hard coating film was prepared in the same manner as in Example 8 except that 1.0 g of a polymerizate obtained by adding 0.2 g of 2,2'-azobisisobutyronitrile to 12 g of methyl methacrylate and allowing the mixture to react with stirring at 75° C. for 3 hours was dissolved in 100 ml of acetone to prepare a solution of a polymethyl methacrylate compound for use thereof as a polymer solution and that the film substrate was replaced with a polycarbonate film. Table 3 summarizes evaluation results of the above substrate coated with the film.

COMPARATIVE EXAMPLE 12

A silicon hard coating agent (Sol Gard NP-730) supplied by Nippon Dacto Shamrock was coated on a 0.4 mm thick polycarbonate film with a bar coater so as to form a dry film having a thickness of 4 μm, and then, the thus-formed coating was cured at 80° C. for 2 hours to give a substrate coated with a desired hard coating film. Table 3 summarizes evaluation results of the above substrate coated with the film.

TABLE 3

|  | Adhesion | Film hardness | Wearing resistance (ΔH %) | Heat resistance |
| --- | --- | --- | --- | --- |
| Ex. 22 | 100/100 | 4H | 8 | 100/100 |
| Ex. 23 | 94/100 | 6H | 8 | 92/100 |
| Ex. 24 | 100/100 | 6H | 6 | 100/100 |
| Ex. 25 | 100/100 | 4H | 8 | 100/100 |
| CEx. 11 | 44/100 | 3H | 28 | 34/100 |
| CEx. 12 | 10/100 | 2H | 55 | 0/100 |

Ex. = Example, CEx. = Comparative Example

As shown in Table 3, when the graded film was used as a primer for the hard coating layer (Examples 22–25), the adhesion both to the organic substrate and the silicon-containing hard coating layer is remarkably excellent since the graded film has a structure containing an inorganic component and an organic component and has a graded structure grading from the inorganic component into the organic component, so that the graded film can allow the hard coating layer to exhibit its full performances.

In contrast, when the acryl silicone having no chemical bond between a methyl methacrylate polymer as Component (A) and an inorganic component as Component (B) is used as a primer layer for a hard coating layer (Comparative Example 11), no graded structure is formed and the adhesion between the inorganic component and the organic component is low since the inorganic component and the organic component are not chemically bonded to each other, so that the hard coating film is poor in performances.

When no primer is formed (Comparative Example 12), the hard coating agent per se is a silicon-containing inorganic material and is therefore poor in adhesion to the organic substrate, so that the hard coating film is poor in performances.

EXAMPLE 26

Optical Recording Medium

The polycarbonate film coated with the graded film, obtained in Example 7, was set in a sputtering apparatus, and an 8 μm thick SiN layer was formed as a dielectric undercoat layer on the graded film to obtain an undercoat-formed resin substrate.

The undercoat-formed resin substrate was set in a sputtering apparatus, and a 10 μm thick TbDyFeCo layer was formed as an optical recording layer on the undercoat, and an 8 μm thick SiN layer was formed as a dielectric protective layer (top coat) to give a desired optical recording medium.

The above optical recording medium was subjected to the following tests. Table 4 summarizes the results.

(1) Adhesion Between Undercoat and Substrate Film

A crosscut tape method was carried out according to JIS K5400. The coating film surface of a test piece was crosscut to form 100 squares having 1 mm×1 mm size each with a rotary cutter, and a Cellotape (trade name) supplied by Nichiban was attached thereto by pressing it and then peeled at a rate of 300 mm/minute at an angle of 180 degrees. The number of square(s) of the 100 squares which were peeled off or not peeled off were counted for evaluation of adhesion.

Further, a test piece was maintained in an oven at 70° C. for 2 hours, temperature-decreased to −30° C. over 2 hours, then maintained at −30° C. for 2 hours and then temperature-increased again up to 70° C. over 2 hours, and this cycle was repeated five times to carry out a heat cycle test. The test piece was similarly measured for an adhesion.

(2) Film Hardness

A pencil hardness test was carried out with a pencil scratching supplied by Yoshimitsu Seiki K.K. according to JIS K5400. A film hardness was evaluated on the basis of whether or not the coating film was scratched.

EXAMPLE 27

A magneto-optical recording medium was obtained in the same manner as in Example 19 except that, after 10 ml of the polymer solution as Component (A) in Example 19 was mixed with 40 ml of acetone and the mixture was homogeneously stirred, 30 ml of ethanol was added, further that the 20 ml of the inorganic component solution as Component (B) in Example 19 was added and that the resultant mixture was stirred until it came to be uniform. Table 4 summarizes evaluation results of the substrate coated with the film.

COMPARATIVE EXAMPLE 13

A magneto-optical recording medium was obtained in the same manner as in Example 26 except that 12 g of methyl methacrylate and 0.2 g of azobisisobutyronitrile were mixed, and that the resultant mixture was maintained at 75° C. with stirring to allow the methyl methacrylate to react for 3 hours, to obtain an organic polymer component.

Table 4 shows properties of the above magneto-optical recording medium.

COMPARATIVE EXAMPLE 14

A magneto-optical recording medium was prepared in the same manner as in Example 26 except that the organic-inorganic composite film was not formed on the polycarbonate substrate.

Table 4 shows properties of the above magneto-optical recording medium.

TABLE 4

| | Adhesion between undercoat and resin substrate | | |
|---|---|---|---|
| | Before heat cycle | After heat cycle | Film hardness |
| Ex. 26 | 100/100 | 95/100 | H |
| Ex. 27 | 100/100 | 94/100 | H |
| CEx. 13 | 81/100 | 65/100 | H |
| CEx. 14 | 0/100 | 0/100 | F |

Ex. = Example, CEx. = Comparative Example

Further, the above substrates were maintained under 70° C. and 90% RH high-temperature high-humidity conditions for 40 hours and then measured for a distortion to study whether or not the substrate causes an error in writing and reading data, to show that none of Examples 26 and 27 and Comparative Examples 13 and 14 had a problem.

Industrial Utility

The organic-inorganic composite graded material of the present invention is an organic-inorganic composite material in which an organic polymer compound and a metallic compound are chemically bonded to each other, has a component-graded structure in which the content of the metallic compound continuously changes in the thickness direction of the material and is useful as a novel functional material in a variety of fields, particularly, as a coating agent for forming a coating, such as a coating film, an adhesive for bonding an organic material to an inorganic or metallic material or an intermediate film to be interposed between an organic substrate and an inorganic or metal-containing coating layer.

What is claimed is:

1. An organic-inorganic composite graded material which is an organic-inorganic composite material comprising a composite in which an organic polymer compound and a metallic compound are chemically bonded to each other, and having a component-graded structure in which the content of the metallic compound in the material continuously changes in the depth direction from the surface of the material, wherein, in the surface of the material, the content of the metallic compound is greater than the content of the organic polymer compound and wherein the metallic compound is a metal-oxide-containing compound or a metal-nitride-containing compound in which the metallic compound is bonded to the organic polymer compound through a metal-oxide-containing compound.

2. The organic-inorganic composite graded material of claim 1, wherein the organic-inorganic composite material consists of a composite in which the organic polymer compound and the metallic compound are chemically bonded to each other.

3. The organic-inorganic composite graded material of claim 1, wherein the metallic compound is a metal-oxide-containing compound.

4. The organic-inorganic composite graded material of claim 1, wherein the metallic compound is a metal-nitride-containing compound.

5. The organic-inorganic composite graded material of claim 1, which has a thickness of 5 $\mu$m or less.

6. The organic-inorganic composite graded material of claim 1, wherein the composite in which the organic polymer compound and the metallic compound are chemically bonded to each other is a hydrolysis product from a mixture of the organic polymer compound having a molecule containing a metal-containing group capable of bonding to a metal oxide by hydrolysis with a metal compound capable of forming a metal oxide by hydrolysis.

7. The organic-inorganic composite graded material of claim 6, wherein the organic polymer compound having a molecule containing a metal-containing group capable of bonding to a metal oxide or a metal nitride polymer by hydrolysis is a copolymer or polycondensate from a monomer having the metal-containing group and a monomer containing no metal.

8. The organic-inorganic composite graded material of claim 7, wherein the organic polymer compound having a molecule containing a metal-containing group capable of bonding to a metal oxide or a metal nitride polymer by hydrolysis is a copolymer from a monomer having an ethylenically unsaturated group and a monomer containing an ethylenically unsaturated group and the metal-containing group.

9. The organic-inorganic composite graded material of claim 6, wherein the metal compound capable of forming a metal oxide by hydrolysis is a metal alkoxide.

10. The organic-inorganic composite graded material of claim 1, wherein the composite in which the organic polymer compound and the metallic compound are chemically bonded to each other is a hydrolysis product from a mixture of the organic polymer compound having a molecule containing a metal-containing group capable of bonding to a metal nitride polymer by hydrolysis with a metal nitride polymer.

11. The organic-inorganic composite graded material of claim 1, which is a film-shaped product formed on an organic substrate, the film-shaped product substantially having a surface formed of a component from the organic polymer compound, the surface being in contact with the organic substrate, and an open surface formed of a component from the metallic compound.

12. A process for the production of the organic-inorganic composite graded material recited in claim 1, which comprises preparing a coating solution which is a mixture of (A) an organic polymer compound having a molecule containing a metal-containing group capable of bonding to a metal oxide or metal nitride polymer by hydrolysis with (B) (a) a metal compound capable of forming a metal oxide by hydrolysis or (b) a metal nitride polymer, or preparing a hydrolysis product of the mixture, forming a coating film made of the above coating solution on a substrate made of an organic material and drying the coating film under heat.

13. The process of claim 12, wherein the coating film is dried to have a thickness of 5 $\mu$m or less.

14. The process of claim 12, wherein the organic polymer compound, as Component (A), having a molecule containing a metal-containing group capable of bonding to a metal oxide or a metal nitride polymer by hydrolysis is a copolymer or polycondensate from a monomer having the metal-containing group and a monomer containing no metal.

15. The process of claim 12, wherein the organic polymer compound, as Component (A), having a molecule containing a metal-containing group capable of bonding to a metal oxide or a metal nitride polymer by hydrolysis is a copolymer from a monomer having an ethylenically unsaturated group and a monomer containing an ethylenically unsaturated group and the metal-containing group.

16. The process of claim 12, wherein the metal compound, as Component (B) (a), capable of forming a metal oxide by hyrolysis is a metal alkoxide.

17. A substrate coated with the organic-inorganic composite graded material of claim 1.

18. The substrate of claim 17, which is an organic substrate.

19. The substrate of claim 18, wherein the organic substrate has a coating of the organic-inorganic composite graded material interposed as an intermediate film and the coating layer contains at least an inorganic or metallic material.

20. The substrate of claim 17, in which the substrate is a metallic substrate having the organic-inorganic composite graded material interposed as an intermediate film and a photocatalytic material layer, and has a surface on which an organic coating film is to be formed.

21. An organic-inorganic adhesive material comprising the organic-inorganic composite graded material of claim 1.

22. An article comprising the organic-inorganic composite graded material of claim 1 interposed as an intermediate film and a coating layer containing at least an inorganic or metallic material.

23. The article of claim 22, wherein the coating layer containing at least an inorganic or metallic material is a photocatalytic material layer.

24. The article of claim 22, wherein the inorganic or metallic material is an inorganic or metallic electrically conductive material.

25. The article of claim 22, wherein the coating layer contains at least an inorganic or metallic material is a scratch-resistant coating layer containing an inorganic or metallic material.

26. The article of claim 22, wherein the coating layer contains at least an inorganic or metallic material is an inorganic or metallic optical recording material layer or an inorganic or metallic dielectric material layer.

* * * * *